US012587078B2

(12) United States Patent (10) Patent No.: US 12,587,078 B2

Itasaka (45) Date of Patent: Mar. 24, 2026

(54) ROTOR, ROTARY ELECTRIC MACHINE, AND VEHICLE

(71) Applicant: Mazda Motor Corporation, Hiroshima (JP)

(72) Inventor: Naoki Itasaka, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 194 days.

(21) Appl. No.: 18/391,636

(22) Filed: Dec. 20, 2023

(65) Prior Publication Data

US 2024/0258890 A1 Aug. 1, 2024

(30) Foreign Application Priority Data

Jan. 31, 2023 (JP) ................................. 2023-012871

(51) Int. Cl.
*H02K 21/02* (2006.01)
*B60K 6/26* (2007.10)

(52) U.S. Cl.
CPC .............. *H02K 21/029* (2013.01); *B60K 6/26* (2013.01); *B60Y 2200/92* (2013.01); *B60Y 2400/607* (2013.01)

(58) Field of Classification Search
CPC ...... H02K 21/029; H02K 1/02; H02K 1/2766; H02K 1/276; H02K 1/28; H02K 21/028; H02K 21/14; H02K 2201/15; H02K 2213/09; B60K 6/26; B60Y 2200/92; B60Y 2400/607
See application file for complete search history.

(56) References Cited

U.S. PATENT DOCUMENTS

2021/0249919 A1* 8/2021 Yang ........................ H02K 1/14

FOREIGN PATENT DOCUMENTS

| EP | 3672027 A1 | 6/2020 |
|----|-----------|--------|
| JP | 2021027700 A | 2/2021 |
| WO | 2012141932 A2 | 10/2012 |

OTHER PUBLICATIONS

European Patent Office, Extended European Search Report Issued in Application No. 24154312.3, Jul. 23, 2024, 14 pages.

* cited by examiner

*Primary Examiner* — Tulsidas C Patel
*Assistant Examiner* — Joshua M Rodriguez
(74) *Attorney, Agent, or Firm* — Alleman Hall LLP

(57) ABSTRACT

A rotor including a rotor core and magnetic pole parts provided therein is provided. The magnetic pole parts are lined up along an outer circumferential surface of the rotor core. Each magnetic pole part includes a fixed magnetic-force magnet with a radially-oriented magnetizing direction, first variable magnetic-force magnets with circumferentially-oriented magnetizing directions, a first cavity part formed in the rotor core to extend between a position radially inward of the fixed magnetic-force magnet and a position radially inward of the first variable magnetic-force magnet, and auxiliary fixed magnetic-force magnets disposed on both sides of the fixed magnetic-force magnet in a circumferential direction so that magnetizing directions thereof are oriented in the circumferential direction. A pole surface with the same polarity as a pole surface facing radially outward of the fixed magnetic-force magnet is located on a fixed magnetic-force magnet side of the auxiliary fixed magnetic-force magnets.

9 Claims, 8 Drawing Sheets

ROTOR, ROTARY ELECTRIC MACHINE, AND VEHICLE

TECHNICAL FIELD

The present disclosure relates to a rotor, a rotary electric machine, and a vehicle.

BACKGROUND OF THE DISCLOSURE

In recent years, in connection with electrification of automobiles which can be seen in hybrid vehicles and electric vehicles, rotary electric machines which are capable of changing the magnetic force of a rotor have been developed. As such a rotary electric machine, JP2021-027700A discloses a variable magnetic-force motor in which a permanent magnet with a small coercive force is incorporated into a rotor.

In the variable magnetic force motor disclosed in JP2021-027700A, a plurality of magnetic pole parts are provided to the rotor. Each magnetic pole part includes a fixed magnetic-force magnet of which the magnetic force does not substantially change, and a variable magnetic-force magnet of which the magnetic force is changeable. As the fixed magnetic-force magnet, a first fixed magnetic-force magnet and a second fixed magnetic-force magnet are provided in a center part of the magnetic pole part in the circumferential direction. The first fixed magnetic-force magnet is disposed radially outward, and the second fixed magnetic-force magnet is disposed radially inward to form a V-shape. The variable magnetic-force magnet is disposed on both sides of the fixed magnetic-force magnet in the circumferential direction. The first fixed magnetic-force magnet is disposed at a position which becomes magnetically in series with the variable magnetic-force magnet, and the second fixed magnetic-force magnet is disposed at a position which becomes magnetically in parallel with the variable magnetic-force magnet.

A field magnetic flux which is generated from a stator is applied to the variable magnetic-force magnet. The magnetizing direction of the variable magnetic-force magnet is switched between two opposite sides in the circumferential direction according to the direction of the field magnetic flux applied. When the magnetizing direction of the variable magnetic-force magnet is oriented toward the fixed magnetic-force magnet, the magnet enters a magnetizing state where the amount of magnetic flux which is generated from the magnetic pole part increases. On the other hand, when the magnetizing direction of the variable magnetic-force magnet is oriented to the opposite side of the fixed magnetic-force magnet, the magnet enters a demagnetizing state where the amount of magnetic flux which is generated from the magnetic force part decreases.

According to the structure of the rotor disclosed in JP2021-027700A, when switching the state to the magnetizing state from the demagnetizing state, or when strengthening the magnetic force of the variable magnetic-force magnet in the magnetizing state, magnetizing processing in which a field magnetic flux which is oriented in the magnetizing direction in the magnetizing state is applied to the variable magnetic-force magnet from the stator is performed. The field magnetic flux applied to the variable magnetic-force magnet by the magnetizing processing is generated by applying electric current to a coil wound around the stator core.

In order to suitably change the magnetic force of the variable magnetic-force magnet within restrictions of the electric current which can be applied to the stator coil, it is necessary in the magnetizing processing to collect the field magnetic flux to the variable magnetic-force magnet to increase the flux density of flux which passes through the variable magnetic-force magnet. On the other hand, in order to suppress the influence of the field magnetic flux related to a control of the magnetization state of the variable magnetic-force magnet on the magnetic force of the fixed magnetic-force magnet, it is preferred to dispose the fixed magnetic-force magnet radially inward of the variable magnetic-force magnet.

However, if the fixed magnetic-force magnet is disposed radially inward of the variable magnetic-force magnet, it is common to become magnetically in parallel like the relationship between the second fixed magnetic-force magnet and the variable magnetic-force magnet in JP2021-027700A, and it is difficult to make the fixed magnetic-force magnet and the variable magnetic-force magnet form the magnetically in series relationship. With the absence of the magnetically in-series relationship between the fixed magnetic-force magnet and the variable magnetic-force magnet, in the magnetizing processing, the high-density magnetic flux which is emitted from the variable magnetic-force magnet and the field magnetic flux for the magnetization which passes through the fixed magnetic-force magnet repel each other in the magnetic pole part where the fixed magnetic-force magnet is disposed so that the N-pole is oriented radially outward. Therefore, the flux density which passes through the variable magnetic-force magnet is reduced, and the magnetic force of the variable magnetic-force magnet cannot be changed suitably.

SUMMARY OF THE DISCLOSURE

One purpose of the present disclosure is to increase a flux density of a magnetic flux which is applied to a variable magnetic-force magnet by magnetizing processing in a rotor in which a fixed magnetic-force magnet is disposed radially inward of the variable magnetic-force magnet.

A first aspect of the present disclosure relates to a rotor. The rotor of the first aspect includes a rotor core, and a plurality of magnetic pole parts provided to the rotor core. The plurality of magnetic pole parts are lined up along an outer circumferential surface of the rotor core. The rotor is combined with a stator disposed radially outward of the rotor core, and a magnetic force of the plurality of magnetic pole parts is changeable by a given magnetic flux generated by the stator. Each magnetic pole part of the plurality of magnetic pole parts includes a fixed magnetic-force magnet disposed so that a magnetizing direction thereof is oriented in a radial direction of the rotor core, first variable magnetic-force magnets which are disposed at positions radially outward of the fixed magnetic-force magnet on both sides of the fixed magnetic-force magnet in a circumferential direction of the rotor core so that magnetizing directions thereof are oriented in the circumferential direction, and a magnetization state of the first variable magnetic-force magnets are changeable by the given magnetic flux, a first cavity part formed in the rotor core so as to extend between a position radially inward of the fixed magnetic-force magnet and a position radially inward of the first variable magnetic-force magnet, and auxiliary fixed magnetic-force magnets disposed on both sides of the fixed magnetic-force magnet in the circumferential direction so that magnetizing directions thereof are oriented in the circumferential direction, wherein a pole surface with the same polarity as a pole surface facing radially outward of the fixed magnetic-force magnet is located on a fixed magnetic-force magnet side of the auxiliary fixed magnetic-force magnets.

According to the first aspect, a surface defining a radially outside of the first cavity part contacts the magnetic flux path between the fixed magnetic-force magnet and the first variable magnetic-force magnet. In the magnetizing processing, the magnetic flux related to a control of the magnetization state of the first variable magnetic-force magnet is guided by the surface defining the radially outside of the first cavity part. Further, the auxiliary fixed magnetic-force magnets are disposed on both sides of the fixed magnetic-force magnet in the circumferential direction. Since the magnetizing direction of the auxiliary fixed magnetic-force magnet is oriented in the circumferential direction, the magnetic flux can be drawn into the fixed magnetic-force magnet by the magnetic force of the auxiliary fixed magnetic-force magnet. Therefore, in the magnetizing processing, the magnetic flux related to the control of the magnetization state of the first fixed magnetic-force magnet can flow into the fixed magnetic-force magnet also from the end surfaces in the circumferential direction. By such a combination, the fixed magnetic-force magnet and the first variable magnetic-force magnet can form a magnetically in series relationship. Therefore, in the magnetizing processing, the high-density magnetic flux which exits from the fixed magnetic-force magnet and the magnetization magnetic flux which passes through the first variable magnetic-force magnet repelling each other can be suppressed, and therefore, the magnetic flux related to the control of the magnetization state can be collected efficiently to the first variable magnetic-force magnet. Therefore, the flux density of the magnetic flux applied to the variable magnetic-force magnets can be increased by the magnetizing processing.

According to a second aspect of the present disclosure, in the rotor of the first aspect, a second cavity part may be formed in a part of the rotor core that is separated radially outward from the first cavity part, and extends toward the auxiliary fixed magnetic-force magnet from a position radially outward of a first variable magnetic-force magnet side of the fixed magnetic-force magnet.

According to the second aspect, a magnetic flux path which is comprised of a part of the rotor core is formed between the first cavity part and the second cavity part. By this flux path, the magnetically in series relationship between the fixed magnetic-force magnet and the first variable magnetic-force magnet can be established. This is advantageous to a further efficient collection of the magnetic flux to the first variable magnetic-force magnet, and an increase in the flux density of the magnetic flux applied to the first variable magnetic-force magnet by the magnetizing processing.

According to a third aspect of the present disclosure, in the rotor of the second aspect, a second variable magnetic-force magnet is disposed between a part of the second cavity part in the rotor core on the first variable magnetic-force magnet side and the outer circumferential surface of the rotor core. The magnetization state of the second variable magnetic-force magnet is changeable by the given magnetic flux.

According to the third aspect of the present disclosure, the second variable magnetic-force magnet is disposed between the fixed magnetic-force magnet and the first variable magnetic-force magnet in the rotor core. Since the magnetizing direction of the second variable magnetic-force magnet is oriented in the circumferential direction similarly to the first variable magnetic-force magnet, the second variable magnetic-force magnet can form a magnetically in series relationship with the fixed magnetic-force magnet and the first variable magnetic-force magnet. Therefore, in the magnetizing processing, the magnetic flux related to a control of the magnetization state of the first variable magnetic-force magnet passes through the second variable magnetic-force magnet between the fixed magnetic-force magnet and the first variable magnetic-force magnet. This collects the magnetic flux to the first variable magnetic-force magnet further efficiently, which is advantageous to an increase of the flux density of the magnetic flux applied to the variable magnetic-force magnets by the magnetizing processing.

A fourth aspect of the present disclosure relates to a rotary electric machine. The rotary machine of the fourth aspect includes the rotor of any one of the first to third aspects, and a stator disposed radially outward of the rotor.

A fifth aspect of the present disclosure relates to a vehicle. The vehicle of the fifth aspect includes the rotary electric machine of the fourth aspect, and driving wheels to which a motive force of the rotary electric machine is transmitted.

DETAILED DESCRIPTION OF THE DISCLOSURE

Hereinafter, an illustrative embodiment is described in detail based on the accompanying drawings. In the following embodiment, a rotor and a rotary electric machine according to the present disclosure will be described as an example where they are applied to a drive motor of an automobile. Note that terms such as "first," "second," and "third" are used in order to distinguish words and phrases to which these terms are given, and they are not intended to limit the number of the words and phrases, or their order.

<Automobile Propelled by Drive Motor>

Figure 1:
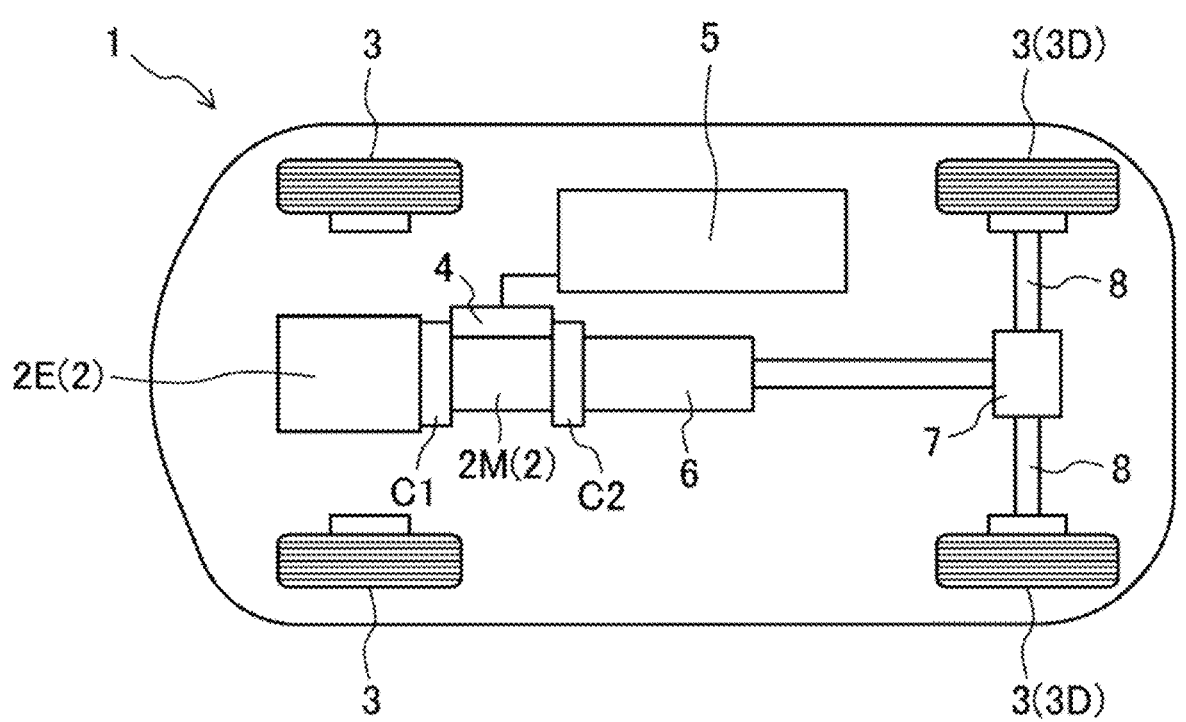
FIG. 1 is a conceptual diagram illustrating a main configuration of an automobile provided with a drive motor according to one embodiment.

An automobile 1 which is propelled by a drive motor is illustrated in FIG. 1. The automobile 1 is a hybrid vehicle. The automobile 1 includes a drive source 2 and four wheels 3.

As the drive source 2, a drive motor (variable magnetic-force motor) 2M to which the art of the present disclosure is applied, and an engine 2E are mounted. The drive motor 2M is one example of a rotary electric machine. Two of the four wheels 3 are driving wheels 3D. The drive motor 2M and the engine 2E collaboratively rotate the two driving wheels 3D. Accordingly, the automobile 1 travels.

The automobile 1 of this example is a so-called "FR (front-engine, rear wheel drive) vehicle." In this automobile 1, the engine 2E is disposed at the front side of the vehicle body, and the driving wheels 3D are disposed at the rear side of the vehicle body. This automobile 1 adopts a so-called "mild hybrid system." The engine 2E is mainly used as the drive source 2 of the automobile 1. The drive motor 2M is used so as to assist the drive of the engine 2E. Further, the drive motor 2M is also used as a power generator during regeneration.

The engine 2E is an internal combustion engine which combusts using, for example, gasoline as fuel. The engine 2E may be a diesel engine which uses diesel oil as fuel. The drive motor 2M is a permanent magnet synchronous motor which drives by three-phase alternate current. Note that this drive motor 2M is a variable magnetic force motor as described above, which is changeable of a magnetic force of a rotor 30. The device for improving the motor performance is given to the structure of the rotor 30 (the details will be described later).

The automobile 1 includes, in addition to the drive motor 2M and the engine 2E, a first clutch C1, an inverter 4, a drive battery 5, a second clutch C2, a transmission 6, and a differential gear 7, as devices of a drive system. The drive motor 2M is coupled to the rear side of the engine 2E via the first clutch C1. The drive battery 5 is connected to the drive motor 2M via the inverter 4.

The drive battery 5 is comprised of a plurality of lithium-ion batteries. The rated voltage of the drive battery 5 is 50V or less (in detail, 48V). The drive battery 5 supplies direct current to the inverter 4. The inverter 4 converts the direct current into three-phase alternate current having different phases, and supplies it to the drive motor 2M. Therefore, the drive motor 2M rotates.

The transmission 6 is coupled to the rear side of the drive motor 2M via the second clutch C2. The transmission 6 is a multi-stage automatic transmission (so-called "AT"). Rotational motive force outputted from one or both of the drive motor 2M and the engine 2E is outputted to the transmission 6 through the second clutch C2. The transmission 6 is coupled to the differential gear 7 via a propeller shaft.

The differential gear 7 is coupled to a pair of driving shafts 8. The pair of driving shafts 8 are coupled to the left and right driving wheels 3D. When the automobile 1 travels (in powering), the rotational motive force which is changed in the speed by the transmission 6 is distributed by the differential gear 7, and is then transmitted to the driving wheels 3D via the respective driving shafts 8.

When the automobile 1 slows down (in regeneration), energy consumed by the drive motor 2M is recovered. In detail, when the automobile 1 brakes, the first clutch C1 is disengaged, while the second clutch C2 is engaged. Accordingly, the drive motor 2M is rotated by the rotational motive force of the driving wheels 3D to generate electricity, the generated power is charged to the drive battery 5 to collect the energy.

<Improvement in Energy Efficiency>

In the case of the hybrid vehicle described above, since the engine 2E is mainly used in powering, the influence of the drive motor 2M on the fuel efficiency is small. On the other hand, since the drive motor 2M is mainly used in regeneration, the influence of the drive motor 2M on the fuel efficiency is large.

The automobile 1 slows down highly frequently so that energy consumed during slowdown is large. Therefore, in order to improve the fuel efficiency of the hybrid vehicle, it is important to increase a rate of the energy recovery in regeneration. In order to increase the rate of the energy recovery in regeneration, increasing the output of the drive motor 2M is effective.

Regarding the increase in the output of the drive motor 2M, it is effective to enable a change in the magnetic force of the rotor 30 of the drive motor 2M. For this reason, the automobile 1 of this example adopts a variable magnetic force motor as the drive motor 2M. The variable magnetic force motor is capable of optimizing a power factor in a wide operating range.

In order to optimize the power factor, it is demanded that an electromagnetic force outputted from a stator 10 is substantially in coincidence with a magnetic force outputted from the rotor 30. However, in the case of a normal permanent-magnet synchronous motor, the magnetic force of the rotor 30 is constant. Therefore, the optimization of the power factor is limited in a comparatively narrow operating range.

On the other hand, since the variable magnetic-force motor is able to change the magnetic force of the rotor 30, it can optimize the power factor within the wide operating range. As a result, the output of the drive motor 2M can be increased. Further, since improvement in the efficiency and a reduction in the back electromotive force can also be realized, the energy efficiency of the automobile 1 (fuel efficiency, electricity efficiency) can be improved.

<Operating Range of Drive Motor>

Figure 2:
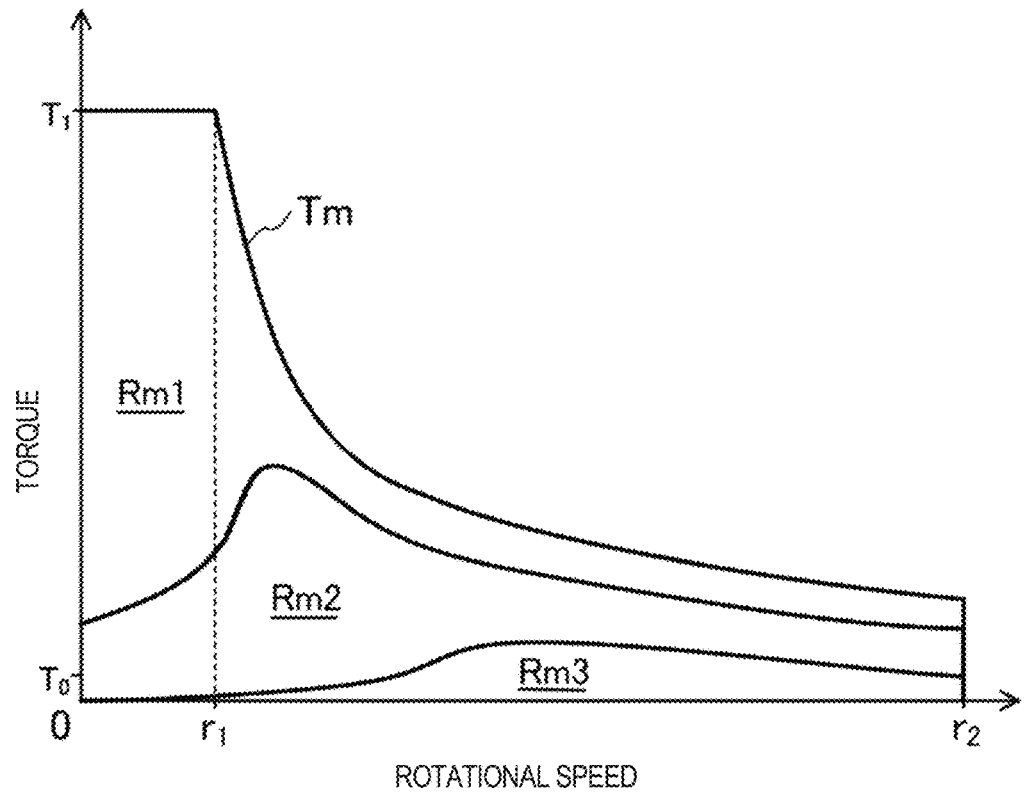
FIG. 2 is a graph illustrating an operating range map of the drive motor according to the embodiment.

FIG. 2 illustrates a map where the operating range of the drive motor 2M is indicated. In this map, the operating range where the drive motor 2M is capable of outputting is defined by a load upper limit line Tm indicating an upper limit of torque (load) depending on the engine speed.

In detail, in a low-speed range up to a given engine speed $r_1$, the upper limit of the torque is held at a maximum torque $T_1$. In a middle-speed range and a high-speed range where the engine speed is higher than the low-speed range, the upper limit of the torque is gradually decreased until the engine speed reaches an upper limit $r_2$. Such an operating range of the variable magnetic force motor is divided into a plurality of magnetizing ranges according to the magnetic force of the rotor 30 to optimize the power factor.

In the map illustrated in FIG. 2, is the magnetizing ranges are divided into a first magnetizing range Rm1, a second magnetizing range Rm2, and a third magnetizing range Rm3. The first magnetizing range Rm1 is a range which includes the maximum torque $T_1$ and extends on the higher-load side along the load upper limit line Tm. The second magnetizing range Rm2 is a range which extends on the lower-load side from the first magnetizing range Rm1. The third magnetizing range Rm3 is a range which extends on the lower-load side from the second magnetizing range Rm2, and includes a torque $T_0$ at which the drive motor 2M is idle (a torque which does not contribute to traveling of the automobile 1).

In these three magnetizing ranges, optimal magnetic forces corresponding to the output are set to the rotor 30, respectively. Normally, the magnetic force of the rotor 30 in the first magnetizing range Rm1 is set higher than the magnetic force of the rotor 30 in the second magnetizing range Rm2. Further, the magnetic force of the rotor 30 in the third magnetizing range Rm3 is set lower than the magnetic force of the rotor 30 in the second magnetizing range Rm2.

While the automobile 1 travels, the magnetizing range is estimated based on the operating state of the drive motor 2M. When moving from one magnetizing range to another, the magnetic force of the rotor 30 is changed according to the magnetic force of the destination magnetizing range. For example, when moving from the second magnetizing range Rm2 to the first magnetizing range Rm1, magnetizing processing is performed by the drive motor 2M. Further, when moving from the second magnetizing range Rm2 to the third magnetizing range Rm3, the demagnetizing processing is performed by the drive motor 2M.

In the magnetizing processing and the demagnetizing processing, a pulse-shaped d-axis current is applied to a given coil 12 at a timing when the rotor 30 is located at a given position with respect to the stator 10. Accordingly, a strong magnetic field (magnetizing magnetic field) is generated by the stator for a variable magnetic-force magnet 50 which is a magnetizing target, and a magnetic flux according to the magnetic field is applied to the variable magnetic-force magnet 50. Thus, the variable magnetic-force magnet 50 is magnetized until a given magnetic force is obtained. The direction of the magnetic field to be generated is opposite between the magnetizing processing and the demagnetizing processing.

In the magnetizing processing, the variable magnetic-force magnet 50 is magnetized so that the magnetic force is oriented in the same direction as a fixed magnetic-force magnet 40, or so that the magnetic force which is oriented in the opposite direction from the fixed magnetic-force magnet 40 becomes weaker. In the demagnetizing processing, the variable magnetic-force magnet 50 is magnetized so that the magnetic force is oriented in the opposite direction from the fixed magnetic-force magnet 40, or so that the magnetic force which is oriented in the same direction as the fixed magnetic-force magnet 40 becomes weaker. The direction of the magnetic force of the variable magnetic-force magnet 50 can be inverted, or the strength of the magnetic force can be changed depending on the magnetization state. In the following description, the increase in the magnetization of the variable magnetic-force magnet 50 by the magnetizing processing is referred to as "magnetization," and the decrease in the magnetization of the variable magnetic-force magnet 50 by the demagnetizing processing is referred to as "demagnetization."

Note that the magnetization of the variable magnetic-force magnet 50 by the magnetizing processing and the demagnetizing processing is limited by onboard apparatuses. That is, in order to magnetize the magnetic force of the variable magnetic-force magnet 50 strongly, it is necessary to supply large current to the drive motor 2M, and it is limited by the voltage of the drive battery 5 and the capacity of the inverter 4.

Although increasing the sizes of these apparatuses may be considered, it is difficult to increase the sizes of the onboard apparatuses. Therefore, the disclosed art devises the structure of the drive motor 2M (especially, the structure of the rotor 30) so that the magnetization can be appropriately performed even under the limited conditions using the existing apparatuses.

<Structure of Drive Motor>

Figure 3:
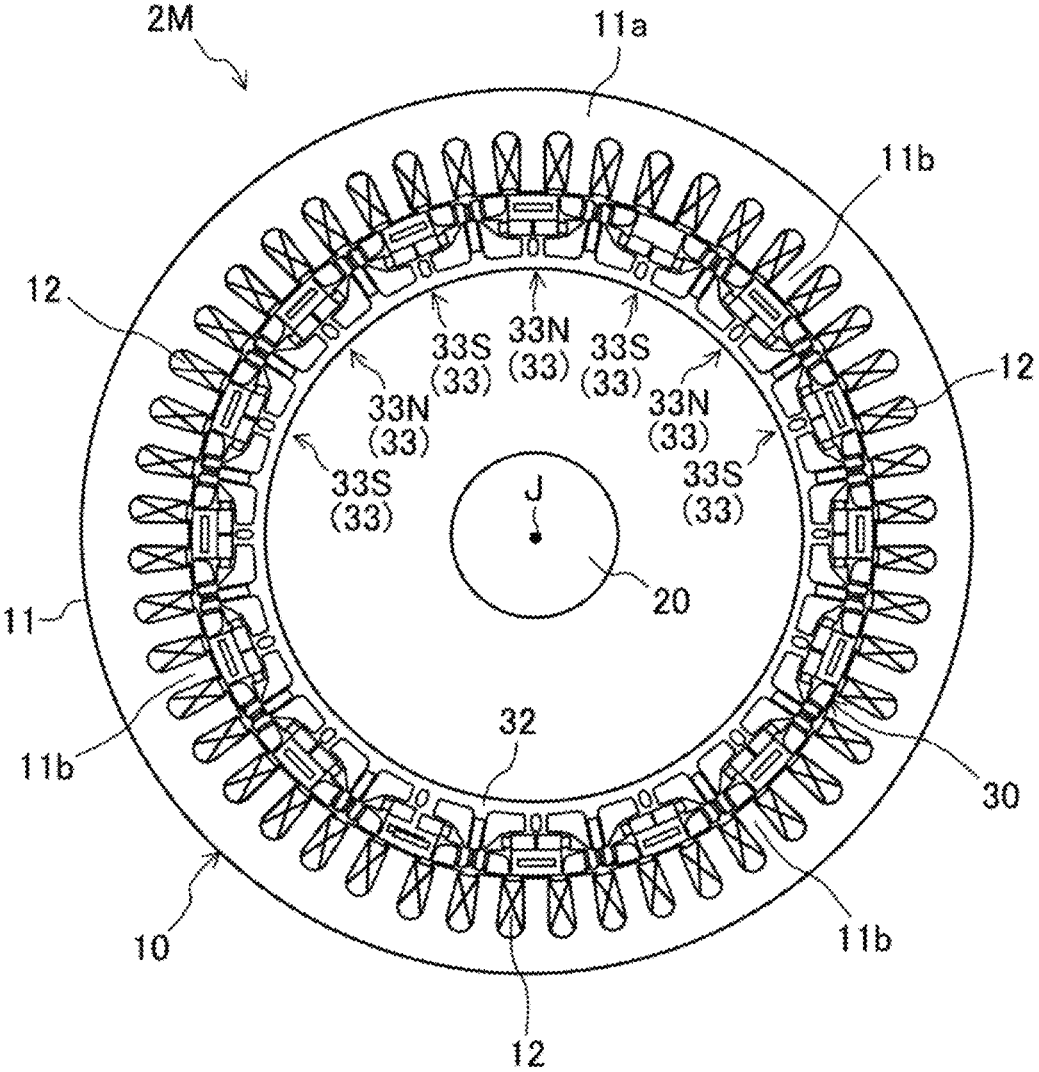
FIG. 3 is a cross-sectional view illustrating an outline configuration of the drive motor according to the embodiment.

FIG. 3 illustrates a cross-sectional structure of the drive motor 2M seen in the axial direction. The drive motor 2M illustrated in FIG. 3 includes the stator 10, the rotor 30, and a shaft 20. The drive motor 2M is a so-called "inner rotor type." Note that in the following description, the axial direction indicates a direction along a rotation axis J of the rotor 30. The radial direction indicates a direction perpendicular to the rotation axis J. The circumferential direction indicates a direction of the circumference centering on the rotation axis J.

The stator 10 is comprised of a cylindrical member, and is accommodated in a motor case (not illustrated) which is fixed to the vehicle body of the automobile 1. The stator 10 includes a stator core 11 and a plurality of coils 12. The stator core 11 is a so-called "laminated iron core," which is constituted by laminating in the axial direction a plurality of steel plates with high magnetic permeability. The coil 12 is constituted by winding electric wires around the stator core 11.

In detail, the stator core 11 has a back yoke 11a and a plurality of teeth 11b. The back yoke 11a is formed annularly in the plan view, and constitutes an outer circumferential side part of the stator core 11. The plurality of teeth 11b protrudes radially inward from the back yoke 11a at equal intervals. The stator 10 of this example has 48 teeth 11b. The coil 12 is constituted by winding an electric wire around a space (slot) formed between adjacent teeth 11b.

The plurality of coils 12 constitute a three-phase coil group which is comprised of U-phase, V-phase, and W-phase which differ in the phase of current flowing therethrough. The coils 12 of these phases are arranged in order in the circumferential direction. Each tooth 11b constitutes an electromagnet with the coil 12 of the corresponding phase. Electric current is applied to each coil 12 from the inverter 4. When the current is applied to the coil 12, a magnetic field is generated around the coil 12.

The rotor 30 is comprised of a cylindrical member and is disposed inward of the stator 10. An outer circumferential surface of the rotor 30 which is combined with the stator 10 opposes to an inner circumference surface of the stator 10 via a given air gap 31. That is, the stator 10 is separated radially outward of the rotor 30 with the distance of air gap 31. The rotor 30 includes a rotor core 32 and a plurality of magnetic pole parts 33. In the rotor 30 of this example, the number of magnetic pole parts 33 is 16.

The rotor core 32 is formed annularly in the plan view. The rotor core 32 is a so-called "laminated iron core," which is constituted by laminating in the axial direction a plurality of steel plates with high magnetic permeability. A shaft bore is formed in a center part of the rotor core 32. The shaft 20 is inserted in the shaft bore. The shaft 20 is supported pivotally by a motor case. The rotor core 32 is fixed to the shaft 20 via a hub. Therefore, the rotor core 32 and the shaft 20 are integrally rotatable centering on the rotation axis J.

In the stator 10, the magnetic field generated by the plurality of coils 12 includes a rotating magnetic field for rotating the rotor 30 and a magnetizing magnetic field for changing the magnetization state of the variable magnetic-force magnet 50.

When driving current (alternate current) is supplied to the plurality of coils 12, the rotating magnetic field is generated. The rotor 30 rotates by the interaction of the rotating magnetic field and the magnetic force of the rotor 30. Further, when the pulse-shaped d-axis current is supplied to the plurality of coils 12 while the rotor 30 rotates (or stops), the magnetizing magnetic field is generated. The magnetization state of the variable magnetic-force magnet 50 is changed by the magnetizing magnetic field to magnetize or demagnetize the variable magnetic-force magnet 50. As a result, the rotor 30 is configured so that the magnetic force of the magnetic pole part 33 is changeable.

Note that although in this embodiment the drive motor 2M with 16 poles and 48 slots is illustrated, the slot combination of the drive motor 2M is not limited to this combination. For example, the slot combination may be constituted so that the number of poles times 2N (×2N) and the number of slots times 3M (×3M) where N and M are integers. Especially, if the drive motor 2M is the type which is mounted on a vehicle, it is preferred to set the number of the poles within a range of 8 or more and 20 or less because of the limitation of the motor size, the demanded output, the structure of the rotor 30, etc.

<Configuration of Pole Part>

The plurality of magnetic pole parts 33 are provided to the rotor core 32. The magnetic pole parts 33 are arranged so that they are lined up along an outer circumferential surface 32a of the rotor core 32. Half (in this example, 8) of the plurality of magnetic pole parts 33 are S-magnetic pole parts 33S, and the remaining half (in this example, 8) are N-magnetic pole parts 33N. The S-magnetic pole part 33S is a magnetic pole part 33 of which the magnetic pole on the outer circumferential surface of the rotor 30 is an S-pole. The N-magnetic pole part 33N is a magnetic pole part 33 of which the magnetic pole on the outer circumferential surface of the rotor 30 is an N-pole.

The S-magnetic pole part 33S and the N-magnetic pole part 33N are provided so that they are lined up alternately in the circumferential direction. The S-magnetic pole part 33S and the N-magnetic pole part 33N have similar configurations except that their poles (in detail, magnetizing directions of the fixed magnetic-force magnet 40, a first auxiliary fixed magnetic-force magnet 41, and a second auxiliary fixed magnetic-force magnet 42, which will be described later) on the outer circumferential surface 32a of the rotor core 32 and the positions in the circumferential direction differ. In the following description, when not distinguishing between the S-magnetic pole part 33S and the N-magnetic pole part 33N, each is simply referred to as the magnetic pole part 33.

Figure 4:
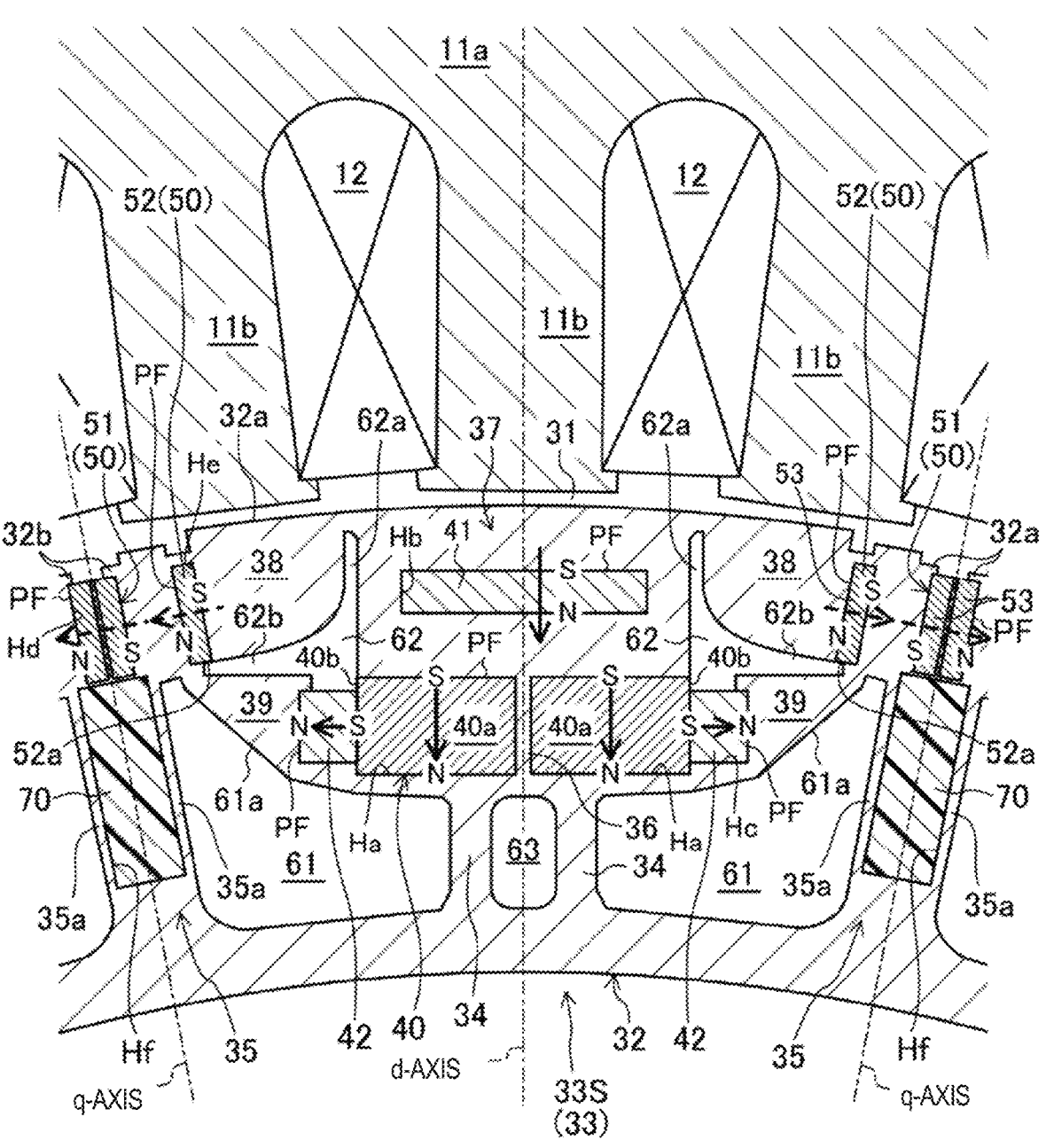
FIG. 4 is a cross-sectional view illustrating an S-magnetic pole part of a rotor according to the embodiment.
Figure 5:
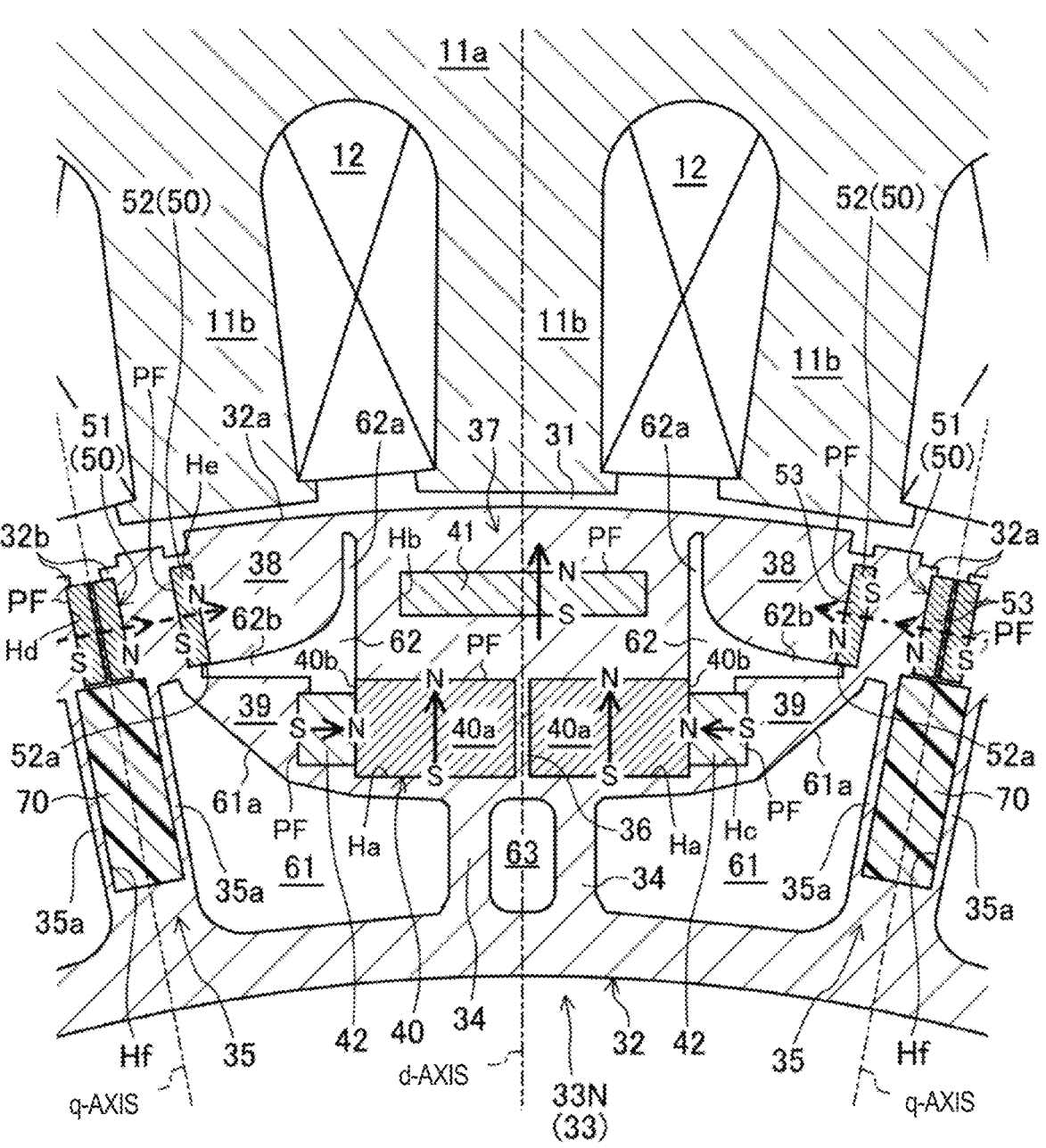
FIG. 5 is a cross-sectional view illustrating an N-magnetic pole part of the rotor according to the embodiment.

FIG. 4 illustrates a view where the S-magnetic pole part 33S of the rotor 30 of FIG. 3 is enlarged. Further, FIG. 5 illustrates a view where the N-magnetic pole part 33N of the rotor 30 of FIG. 3 is enlarged. In FIGS. 4 and 5, a line which extends radially from the rotation axis J and passes through the center of each magnetic pole part 33 in the circumferential direction indicates a d-axis (direct axis). Further, a line which extends radially from the rotation axis J and passes through the center between two adjacent magnetic pole parts 33 indicates a q-axis (quadrature axis).

Each magnetic pole part 33 includes the fixed magnetic-force magnet 40, the first auxiliary fixed magnetic-force magnet 41, the second auxiliary fixed magnetic-force magnet 42, the variable magnetic-force magnet 50, a nonmagnetic material 70, and a cavity part. As the variable magnetic-force magnet 50, a first variable magnetic-force magnet 51 and a second variable magnetic-force magnet 52 are provided. As the cavity part, a first cavity part 61, a second cavity part 62, and a third cavity part 63 are provided.

Solid-line arrows in FIGS. 4 and 5 indicate magnetizing directions of the fixed magnetic-force magnet 40, the first auxiliary fixed magnetic-force magnet 41, and the second auxiliary fixed magnetic-force magnet 42. Further, broken-line arrows in FIGS. 4 and 5 indicate magnetizing direction of the first variable magnetic-force magnet 51 and the second variable magnetic-force magnet 52 in the magnetizing state.

<Fixed Magnetic-Force Magnet>

The fixed magnetic-force magnet 40 is a magnetic element used as a main body of each magnetic pole part 33, and plays a role in determining the polarity of the magnetic pole part 33 (S-magnetic pole part 33S or N-magnetic pole part 33N). The magnetic force of the fixed magnetic-force magnet 40 is the strongest. The fixed magnetic-force magnet 40 is formed in a rectangular shape in which long sides are sufficiently longer than the short side (for example, about 4 times longer). The fixed magnetic-force magnet 40 is located in a center part of the magnetic pole part 33 in the circumferential direction. The fixed magnetic-force magnet 40 is located comparatively inward within the magnetic pole part 33 in the radial direction. The fixed magnetic-force magnet 40 is disposed so that the magnetizing direction is oriented in the radial direction centering on the d-axis.

The fixed magnetic-force magnet 40 is provided so that a side surface on the long side is located along a direction perpendicular in the radial direction. Both the side surfaces of the long sides of the fixed magnetic-force magnet 40 constitute pole surfaces PF into/from which the magnetic flux enters/exits. Each pole surface PF of the fixed magnetic-force magnet 40 is perpendicular to the d-axis. The magnetizing direction of the fixed magnetic-force magnet 40 is inverted between the S-magnetic pole part 33S and the N-magnetic pole part 33N. In the fixed magnetic-force magnet 40 of the S-magnetic pole part 33S, the pole surface PF which faces radially outward is the S-pole, and the pole surface PF which faces radially inward is the N-pole. In the fixed magnetic-force magnet 40 of the N-magnetic pole part 33N, the pole surface PF which faces radially outward is the N-pole, and the pole surface PF which faces radially inward is the S-pole.

The fixed magnetic-force magnet 40 of this example is bisected at a position at which the d-axis passes. The fixed magnetic-force magnet 40 is comprised of a pair of magnet pieces 40a. The size of the pair of magnet pieces 40a (length and width) is mutually equivalent. The pair of magnet pieces 40a are located in line symmetry with respect to the d-axis. An inner coupling part 36 is provided in a middle part of the fixed magnetic-force magnet 40 in the rotor core 32. The inner coupling part 36 extends in the radial direction between the pair of magnet pieces 40a, and couples a radially inward part and a radially outward part of the fixed magnetic-force magnet 40 of the rotor core 32. The inner coupling part 36 extends on the d-axis.

The fixed magnetic-force magnet 40 is embedded in the rotor core 32. A first accommodating hole Ha is formed at a disposed position of the fixed magnetic-force magnet 40 in the rotor core 32. The first accommodating hole Ha is defined by the inner coupling part 36. Each magnet piece 40a is accommodated in the first accommodating hole Ha. The first accommodating hole Ha may be designed so that a gap is formed as needed in a state where the fixed magnetic-force magnet 40 is accommodated. The magnet piece 40a is fixed to the rotor core 32 inside the first accommodating hole Ha. Adhesives are used for the fixation of the magnet piece 40a, for example.

The first auxiliary fixed magnetic-force magnet 41 is an auxiliary magnetic element of each magnetic pole part 33, and has a function to reinforce the magnetic force of the fixed magnetic-force magnet 40. The magnetic force of the first auxiliary fixed magnetic-force magnet 41 is the second strongest subsequently to the fixed magnetic-force magnet 40. The first auxiliary fixed magnetic-force magnet 41 is formed in a rectangular shape in which both the short sides and the long sides are smaller than those of the fixed magnetic-force magnet 40. The first auxiliary fixed magnetic-force magnet 41 is disposed between the fixed magnetic-force magnet 40 of the rotor core 32 and the outer circumferential surface 32a of this rotor core 32 so that the magnetizing direction is oriented in the radial direction centering on the d-axis.

The first auxiliary fixed magnetic-force magnet 41 is also provided so that the side surfaces on the long sides are oriented along a direction perpendicular in the radial direction. Both the side surfaces of the long sides of the first auxiliary fixed magnetic-force magnet 41 constitute pole surfaces PF. Each pole surface PF of the first auxiliary fixed magnetic-force magnet 41 is perpendicular to the d-axis. In each magnetic pole part 33, the magnetizing direction of the first auxiliary fixed magnetic-force magnet 41 is oriented in the same direction as the magnetizing direction of the fixed magnetic-force magnet 40 to reinforce the magnetic force of the fixed magnetic-force magnet 40. That is, the pole surfaces PF (S-pole and N-pole) of the first auxiliary fixed magnetic-force magnet 41 and the fixed magnetic-force magnet 40 which are lined up in the radial direction are oriented in the same direction.

The first auxiliary fixed magnetic-force magnet 41 is embedded in the rotor core 32. A second accommodating hole Hb is formed at a disposed position of the first auxiliary fixed magnetic-force magnet 41 in the rotor core 32. The first auxiliary fixed magnetic-force magnet 41 is accommodated in the second accommodating hole Hb. The second accommodating hole Hb may be designed so that a gap is formed as needed is in a state where the first auxiliary fixed magnetic-force magnet 41 is accommodated. The first auxiliary fixed magnetic-force magnet 41 is fixed to the rotor core 32 inside the second accommodating hole Hb. Adhesives are used for the fixation of the first auxiliary fixed magnetic-force magnet 41, for example.

The second auxiliary fixed magnetic-force magnet 42 is an auxiliary magnetic element of each magnetic pole part 33, and has a function to guide the magnetic flux of the fixed magnetic-force magnet 40. Two second auxiliary fixed magnetic-force magnets 42 are provided to each magnetic pole part 33. The second auxiliary fixed magnetic-force magnet 42 is formed in a rectangular shape of which the long side is slightly longer than the short side. The second auxiliary fixed magnetic-force magnets 42 are disposed on both sides of the fixed magnetic-force magnet 40 in the circumferential direction so that the magnetizing direction is oriented in the circumferential direction. The second auxiliary fixed magnetic-force magnet 42 is disposed in line symmetry with respect to the d-axis.

The second auxiliary fixed magnetic-force magnet 42 is provided so that the side surface on the long side is oriented in the radial direction. Both the side surfaces of the long side of the second auxiliary fixed magnetic-force magnet 42 constitute pole surfaces PF. The pole surface PF of the second auxiliary fixed magnetic-force magnet 42 is in a relationship parallel to the d-axis, and faces in the circumferential direction. The second auxiliary fixed magnetic-force magnet 42 is located adjacent to an end part of the fixed magnetic-force magnet 40 in the circumferential direction. One of the pole surfaces PF of the second auxiliary fixed magnetic-force magnet 42 is in contact with the fixed magnetic-force magnet 40.

In the second auxiliary fixed magnetic-force magnet 42, the pole surface PF which has the same polarity as the pole surface PF which faces radially outward of the fixed magnetic-force magnet 40 is located on the fixed magnetic-force magnet 40 side (that is, is oriented toward the fixed magnetic-force magnet 40). In the second auxiliary fixed magnetic-force magnet 42 of the S-magnetic pole part 33S, the pole surface PF which faces on the fixed magnetic-force magnet 40 side is an S-pole, the pole surface PF on the opposite side is an N-pole, and the pole surface PF of the S-pole contacts the fixed magnetic-force magnet 40. In the second auxiliary fixed magnetic-force magnet 42 of the N-magnetic pole part 33N, the pole surface PF which faces on the fixed magnetic-force magnet 40 side is an N-pole, the pole surface PF on the opposite side is an S-pole, and the pole surface PF of the N-pole contacts the fixed magnetic-force magnet 40.

The second auxiliary fixed magnetic-force magnet 42 is embedded in the rotor core 32. A third accommodating hole Hc is formed at a disposed position of the second auxiliary fixed magnetic-force magnet 42 in the rotor core 32. The third accommodating hole Hc communicates with the second accommodating hole Hb. The second auxiliary fixed magnetic-force magnet 42 is accommodated in the third accommodating hole Hc. The third accommodating hole Hc may be designed so that a gap is formed as needed in a state where the second auxiliary fixed magnetic-force magnet 42 is accommodated. The second auxiliary fixed magnetic-force magnet 42 is fixed to the rotor core 32 inside the third accommodating hole Hc. Adhesives are used for the fixation of the second auxiliary fixed magnetic-force magnet 42, for example.

The fixed magnetic-force magnet 40, the first auxiliary fixed magnetic-force magnet 41, and the second auxiliary fixed magnetic-force magnet 42 are similar to a conventional permanent magnet, which is a magnet in which a flux density of the magnetic material is substantially unchangeable (i.e., the magnetic force is constant and does not change). A magnet with high flux density and large coercive force is used for the fixed magnetic-force magnet 40, the first auxiliary fixed magnetic-force magnet 41, and the second auxiliary fixed magnetic-force magnet 42. Such a magnet includes an Nd—Fe—B magnet, an Sm—Co magnet, an Fe—Ni magnet, and a ferrite magnet, for example.
<Variable Magnetic-Force Magnet>

The first variable magnetic-force magnet 51 and the second variable magnetic-force magnet 52 are magnetic elements which serve as the main body of each magnetic pole part 33 by collaborating with the fixed magnetic-force magnet 40, and play a role to change the magnetic force of the magnetic pole part 33. Each of the first variable magnetic-force magnet 51 and the second variable magnetic-force magnet 52 is capable of changing the magnetization state by the magnetic flux according to the magnetizing magnetic field (a given magnetic flux; hereinafter, referred to as a "magnetization magnetic flux"). The maximum total magnetic force of the first variable magnetic-force magnet 51 and the second variable magnetic-force magnet 52 is set to a magnetic force equivalent to or below the total magnetic force of the fixed magnetic-force magnet 40, the first auxiliary fixed magnetic-force magnet 41, and the second auxiliary fixed magnetic-force magnet 42.

The first variable magnetic-force magnets 51 are disposed on both sides of the fixed magnetic-force magnet 40 in the circumferential direction. The first variable magnetic-force magnet 51 is disposed radially outward of the fixed magnetic-force magnet 40. The first variable magnetic-force magnet 51 is disposed so that it covers over adjacent magnetic pole parts 33 and the magnetizing direction is oriented in the circumferential direction centering on the q-axis. The first variable magnetic-force magnets 51 are located at both ends of the magnetic pole part 33 in the circumferential direction, and are shared by adjacent magnetic pole parts 33 (the S-magnetic pole parts 33S and the N-magnetic pole parts 33N).

The first variable magnetic-force magnet 51 is constituted by two magnetic material pieces 53. The magnetic material piece 53 is formed in a rectangular shape in which the long sides are sufficiently longer than the short sides (for example, about 5 times longer). The size (length and width) of the two magnetic material pieces 53 is mutually equivalent. The two magnetic material pieces 53 are disposed in line symmetry with respect to the q-axis, and each is adjacent to the q-axis. The length of the long side of the magnetic material piece 53 is substantially the same as the length of the short side of the fixed magnetic-force magnet 40. The magnetic material piece 53 is disposed so that the side surfaces on the long sides is oriented in the radial direction.

The side surface of the long side of the magnetic material piece 53 constitutes a pole surface PF. The pole surface PF of the magnetic material piece 53 is in a relationship parallel to the q-axis, and faces in the circumferential direction. The two magnetic material pieces 53 are disposed next to each other in a state where their long sides are abutted to each other in the circumferential direction. The size of the first variable magnetic-force magnet 51 constituted in such a way is smaller than the size of the fixed magnetic-force magnet 40. The coercive force of the first variable magnetic-force magnet 51 is smaller than the coercive forces of the fixed magnetic-force magnet 40, the first auxiliary fixed magnetic-force magnet 41, and the second auxiliary fixed magnetic-force magnet 42.

The first variable magnetic-force magnet 51 is embedded in the rotor core 32. A fourth accommodating hole Hd is formed at a disposed position of the first variable magnetic-force magnet 51 in the rotor core 32. The first variable magnetic-force magnet 51 is accommodated in the fourth accommodating hole Hd. The first variable magnetic-force magnet 51 is fixed to the rotor core 32 inside the fourth accommodating hole Hd. Adhesives are used for the fixation of the first variable magnetic-force magnet 51, for example.

The fourth accommodating hole Hd is opened at the outer circumferential side of the rotor core 32. An overhang piece 32b which overhangs inwardly of its opening is provided on both sides in the circumferential direction in the open end of the fourth accommodating hole Hd. The overhang piece 32b functions as a lock which prevents withdrawal of the first variable magnetic-force magnet 51. The first variable magnetic-force magnet 51 is exposed on the outer circumference side of the rotor core 32 from the open end (between the overhang pieces 32b) of the fourth accommodating hole Hd (i.e., the stator 10 side).

Two second variable magnetic-force magnets 52 are provided to each magnetic pole part 33. The second variable magnetic-force magnet 52 is disposed between the fixed magnetic-force magnet 40 and each first variable magnetic-force magnet 51 in the circumferential direction. The second variable magnetic-force magnet 52 is disposed radially outward of the fixed magnetic-force magnet 40. In detail, the second variable magnetic-force magnet 52 is disposed at a position closer to the first variable magnetic-force magnet 51, between the first auxiliary fixed magnetic-force magnet 41 and the first variable magnetic-force magnet 51.

The second variable magnetic-force magnet 52 is disposed in line symmetry with respect to the d-axis. The second variable magnetic-force magnet 52 is disposed so that it is lined up in parallel with the first variable magnetic-force magnet 51 in the circumferential direction with a gap therebetween and the magnetizing direction is oriented in the circumferential direction. The second variable magnetic-force magnet 52 is set magnetically in series with the first variable magnetic-force magnet 51 during the magnetizing processing. The second variable magnetic-force magnet 52 is constituted by one magnetic material piece 53 which is the same as that of the first variable magnetic-force magnet 51.

The magnetic material piece 53 is disposed so that the side surface on the long side which forms the pole surface PF is oriented along the radial direction. The pole surface PF of the magnetic material piece 53 is in a relationship parallel to the q-axis, and faces in the circumferential direction. The size of the second variable magnetic-force magnet 52 is sufficiently smaller than the size of the fixed magnetic-force magnet 40. The coercive force of the second variable magnetic-force magnet 52 is weaker than the coercive forces of the fixed magnetic-force magnet 40, the first auxiliary fixed magnetic-force magnet 41, and the second auxiliary fixed magnetic-force magnet 42.

The second variable magnetic-force magnet 52 is embedded in the rotor core 32. A fifth accommodating hole He is formed at a disposed position of the second variable magnetic-force magnet 52 in the rotor core 32. The second variable magnetic-force magnet 52 is accommodated in the fifth accommodating hole He. The fifth accommodating hole He may be designed so that a gap is formed as needed in a state where the second variable magnetic-force magnet 52 is accommodated. The second variable magnetic-force magnet 52 is fixed to the rotor core 32 inside the fifth accommodating hole He. Adhesives are used for the fixation of the second variable magnetic-force magnet 52, for example.

Each of the first variable magnetic-force magnet 51 and the second variable magnetic-force magnet 52 is a magnet in which the magnetic flux density is variable (i.e., the magnetic force is changeable). A magnet with high flux density but small coercive force is used for the first variable magnetic-force magnet 51 and the second variable magnetic-force magnet 52. Such a magnet includes an Nd—Fe—B magnet, an Sm—Co magnet, an Fe—Ni magnet, and an Al—Ni—Co magnet, for example.

The magnetization states of the first variable magnetic-force magnet 51 and the second variable magnetic-force magnet 52 are easier to change than the magnetization states of the fixed magnetic-force magnet 40, the first auxiliary fixed magnetic-force magnet 41, and the second auxiliary fixed magnetic-force magnet 42. Although the magnetization states of the fixed magnetic-force magnet 40, the first auxiliary fixed magnetic-force magnet 41, and the second auxiliary fixed magnetic-force magnet 42 do not substantially change with the large current which is outputtable from the drive battery 5 and the inverter 4 (for example, 750 Amperes RMS), this current can change the magnetization states of the first variable magnetic-force magnet 51 and the second variable magnetic-force magnet 52. Therefore, the magnetic forces of the first variable magnetic-force magnet 51 and the second variable magnetic-force magnet 52 are changeable. Note that the current when driving the drive motor 2M also hardly changes the magnetization states of the first variable magnetic-force magnet 51 and the second variable magnetic-force magnet 52. Therefore, for the normal drive, the first variable magnetic-force magnet 51 and the second variable magnetic-force magnet 52 also function as permanent magnets.

The nonmagnetic material 70 is disposed radially inward of the first variable magnetic-force magnet 51. The nonmagnetic material 70 is formed in a rectangular shape in which the long side is sufficiently longer than the short side (for example, about 3 times longer). The nonmagnetic material 70 is disposed so that the side surface of the short side is perpendicular to the q-axis centering on the q-axis. The length of the short side of the nonmagnetic material 70 is longer than the length of the short side of the first variable magnetic-force magnet 51. The nonmagnetic material 70 is located radially inward of the full width in the circumferential direction of the first variable magnetic-force magnet 51. The nonmagnetic material 70 is made of synthetic resin, for example.

The nonmagnetic material 70 is embedded in the rotor core 32. A sixth accommodating hole Hf is formed at the disposed position of the nonmagnetic material 70 in the rotor core 32. The nonmagnetic material 70 is accommodated in the sixth accommodating hole Hf. The sixth accommodating hole Hf may communicate with the fifth accommodating hole He. The sixth accommodating hole Hf may be designed so that a gap is formed as needed in a state where the nonmagnetic material 70 is accommodated. The nonmagnetic material 70 is fixed to the rotor core 32 inside the sixth accommodating hole Hf. Adhesives are used for the fixation of the nonmagnetic material 70, for example.

Two first cavity parts 61 are formed at each magnetic pole part 33. The two first cavity parts 61 are disposed in line symmetry with respect to the d-axis. The first cavity part 61 has a larger aperture area than the second cavity part 62 and the third cavity part 63. The first cavity part 61 is formed in the rotor core 32 so that it extends between a position radially inward of to the fixed magnetic-force magnet 40 and a position radially inward of the first variable magnetic-force magnet 51. The first cavity part 61 is formed so that it corresponds partly in the radial direction to the fixed magnetic-force magnet 40 and the second auxiliary fixed magnetic-force magnet 42.

In detail, the first cavity part 61 extends from a position radially inward of the magnet piece 40a which forms the fixed magnetic-force magnet 40 to a position near the nonmagnetic material 70 in the circumferential direction. The first cavity part 61 extends progressively more radially outward from the fixed magnetic-force magnet 40 side thereof toward the nonmagnetic material 70 thereof. A radially outward part of the first cavity part 61 is located between the second auxiliary fixed magnetic-force magnet 42 and the nonmagnetic material 70, immediately radially inward of an area between the first variable magnetic-force magnet 51 and the second variable magnetic-force magnet 52.

A first pillar part 35 is formed in the rotor core 32, between the first cavity parts 61 which are adjacent to each other on both sides of the q-axis. The first pillar part 35 includes the nonmagnetic material 70. The width of the first pillar part 35 in the circumferential direction is slightly wider than the width of the nonmagnetic material 70 in the circumferential direction. Wall parts 35a between the first cavity parts 61 on both sides of the nonmagnetic material 70 in the first pillar part 35 are comparatively thin, and, for example, they are the thinnest in the rotor core 32.

The third cavity part 63 is formed between two first cavity parts 61 at each magnetic pole part 33. The third cavity part 63 is formed substantially in a rectangular shape centering on the d-axis. A second pillar part 34 is formed between each first cavity part 61 and the third cavity part 63 in the rotor core 32. The second pillar part 34 is disposed in line symmetry with respect to the d-axis. The second pillar part 34 is located on the d-axis side with respect to the full width of the fixed magnetic-force magnet 40.

The radially outside of the first cavity part 61 is defined by a curved surface 61a which extends from a radially outward end part of the first pillar part 35 to a radially outward end part of the second pillar part 34. The curved surface 61a is located near the fixed magnetic-force magnet 40 and the second auxiliary fixed magnetic-force magnet 42, and extends along the fixed magnetic-force magnet 40 and the second auxiliary fixed magnetic-force magnet 42. The curved surface 61a has an arc shape which bulges radially inward, when seen in the axial direction.

Two second cavity parts 62 are formed at each magnetic pole part 33. The two second cavity parts 62 are also disposed in line symmetry with respect to the d-axis. The second cavity part 62 is separated radially outward of the first cavity part 61, and is located between the first auxiliary fixed magnetic-force magnet 41 and the first variable magnetic-force magnet 51 in the circumferential direction. The second cavity part 62 is formed in the rotor core 32 so that it extends toward the first variable magnetic-force magnet 51, from a position radially outward of a surface of the fixed magnetic-force magnet 40 on the first variable magnetic-force magnet 51 side (e.g., an end surface 40b), in the circumferential direction.

In detail, the second cavity part 62 is formed substantially in an L-shape. The second cavity part 62 has a radial-side extending part 62a and a circumferential-side extending part 62b. The radial-side extending part 62a extends radially outwardly from a radially outward side of the second auxiliary fixed magnetic-force magnet 42 so that it partitions between the first auxiliary fixed magnetic-force magnet 41 and the first variable magnetic-force magnet 51. The circumferential-side extending part 62b extends from a position radially outward of the second auxiliary fixed magnetic-force magnet 42 to a position radially inward of the second variable magnetic-force magnet 52.

The width of the radial-side extending part 62a in the circumferential direction becomes narrower in a radially outward direction from the fixed magnetic-force magnet 40 up to a position in the middle of the radial-side extending part 62a, and it is substantially constant from the position in the middle of the radial-side extending part 62a up to a radially outward end part. The width of the circumferential-side extending part 62b in the radial direction becomes narrower as it approaches the first variable magnetic-force magnet 51 in the circumferential direction. The minimum width of the circumferential-side extending part 62b in the radial direction is equivalent to the minimum width of the radial-side extending part 62a in the circumferential direction, or wider than the minimum width of the radial-side extending part 62a in the circumferential direction.

A side surface of the radial-side extending part 62a on the d-axis side extends linearly in the radial direction, when seen in the axial direction. A side surface radially inward of the circumferential-side extending part 62b also extends linearly in the circumferential direction. Further, a side surface including the q-axis side of the radial-side extending part 62a and the radially outward side of the circumferential-side extending part 62b is curved and bulges toward an end part of the fixed magnetic-force magnet 40. Thus, the second cavity part 62 is configured so that each of the width of the radial-side extending part 62a in the circumferential direction and the width of the circumferential-side extending part 62b in the radial direction changes according to a position in the extending direction.

The second cavity part 62 contacts the corresponding end of the fixed magnetic-force magnet 40 and the second auxiliary fixed magnetic-force magnet 42. A part of the end surface 40*b* of the fixed magnetic-force magnets 40 radially outward of a part which contacts the second auxiliary fixed magnetic-force magnet 42 is exposed to the second cavity part 62. Part of a radially outward side surface of the second auxiliary fixed magnetic-force magnet 42 is also exposed to the second cavity part 62. Therefore, a first closure area 37 is formed in a radially outward part of each magnetic pole part 33. The first closure area 37 is defined by the two second cavity parts 62 on both sides in the circumferential direction and the pole surface PF of the fixed magnetic-force magnet 40 as an inward side in the radial direction.

The first auxiliary fixed magnetic-force magnet 41 is disposed in the first closure area 37 in a state where both ends in the circumferential direction are brought close to the radial-side extending parts 62*a*. The distance between each end part of the first auxiliary fixed magnetic-force magnet 41 and each side surface of the radial-side extending part 62*a* on the d-axis side is the same. The second variable magnetic-force magnet 52 is disposed between a part of the rotor core 32 on the first variable magnetic-force magnet 51 side of the second cavity part 62 (i.e., a tip-end part of the circumferential-side extending part 62*b*) and the outer circumferential surface 32*a* of this rotor core 32. The tip-end part of the circumferential-side extending part 62*b* is lower in the magnetic reluctance, as compared with other parts of the circumferential-side extending part 62*b*, because the tip-end part has a narrower width in the radial direction. Therefore, the second variable magnetic-force magnet 52 forms the magnetically in series relationship also with the fixed magnetic-force magnet 40 via the tip-end part of the circumferential-side extending part 62*b* during the magnetizing processing.

The second cavity part 62 contacts an end part of the corresponding second variable magnetic-force magnet 52. A part of a radially inward end surface 52*a* of the second variable magnetic-force magnet 52 is exposed to the tip-end part of the circumferential-side extending part 62*b*. Therefore, a second closure area 38 is formed on both sides of the first closure area 37 in the circumferential direction of each magnetic pole part 33. The second closure area 38 is formed by defining both sides in the circumferential direction and inside in the radial direction by the second cavity part 62 and the second variable magnetic-force magnet 52.

Further, a flux path 39 is formed on both sides of the fixed magnetic-force magnet 40 in the circumferential direction of each magnetic pole part 33. The flux path 39 is formed by defining the first pillar part 35 side in the circumferential direction and both sides in the radial direction by the first cavity part 61 and the second cavity part 62. The second auxiliary fixed magnetic-force magnet 42 is disposed in the flux path 39 in a state where a radially inward end part is separated from the first cavity part 61 by a given distance. Therefore, the flux path 39 also extends radially inward of the fixed magnetic-force magnet 40. The fixed magnetic-force magnet 40 and the first variable magnetic-force magnet 51 are configured to be magnetically in series by the flux path 39 during the magnetizing processing.

<Devise Corresponding to Operation of Drive Motor>

As described above, as for the drive motor 2M, the output which is stable in a wide operating range is demanded. From the viewpoint of improving energy efficiency (fuel efficiency, electricity efficiency), optimization of the power factor is demanded in this wide operating range. In addition, in the case of the variable magnetic force motor, the magnetizing direction is completely opposite with respect to the variable magnetic-force magnet 50 between the magnetizing processing and the demagnetizing processing.

Therefore, in order to realize an increase in the output and an improvement in the efficiency of the drive motor 2M, it is necessary to enable it to optimize the flow of the magnetic flux to various operation scenes, such as during the magnetizing processing, after the magnetizing processing, during the demagnetizing processing, after the demagnetizing processing, during the maximum torque output, and during operation at high power factor. The above-described structure of the rotor 30 is devised in order to realize the demand.

<Devise for Magnetizing Processing>

As described above, the large current which can be supplied to the drive motor 2M is limited. Therefore, under such limitation, the variable magnetic-force magnet 50 is preferred to be magnetized efficiently until the magnetic force reaches saturation. However, such magnetizing processing cannot be realized only by disposing the fixed magnetic-force magnet 40 and the variable magnetic-force magnet 50 at the fundamental positions.

Figure 6:
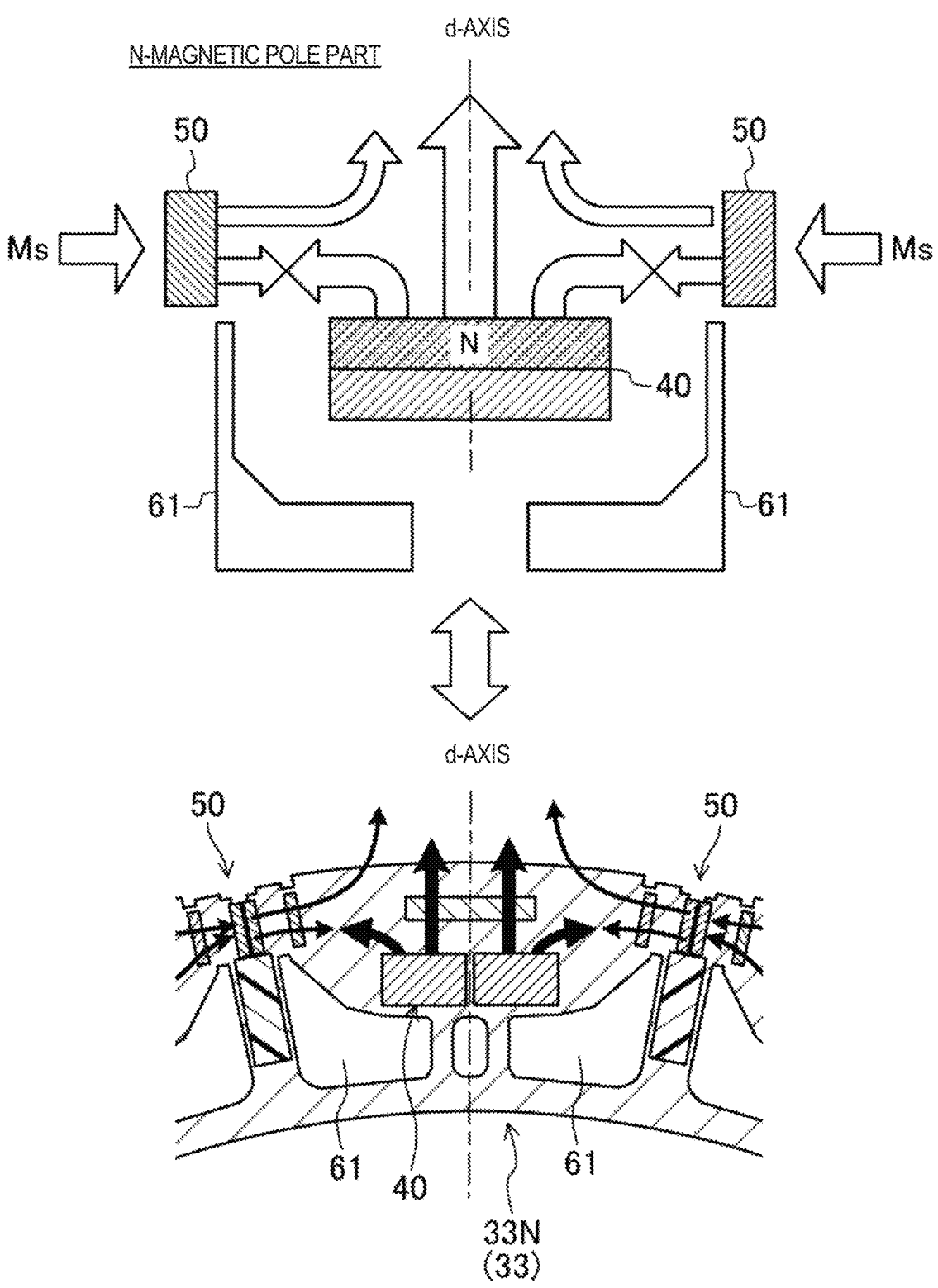
FIG. 6 is a conceptual diagram illustrating a configuration of an N-magnetic pole part of a rotor, and a flow of a magnetic flux during magnetizing processing, according to a comparative example.

FIG. 6 illustrates a structure of the rotor 30 according to a comparative example. In FIG. 6, the upper figure is a schematic diagram and the lower figure is a view corresponding to the rotor 30 of this embodiment. During the magnetizing processing, a strong magnetizing magnetic field is applied to the variable magnetic-force magnet 50 as illustrated by arrows Ms. A magnetic flux according to this magnetizing magnetic field (magnetization magnetic flux) flows from the d-axis side of the S-magnetic pole part 33S to the d-axis side of the N-magnetic pole part 33N through the variable magnetic-force magnet 50.

In the rotor 30 according to the comparative example, the second cavity part 62 and the second auxiliary fixed magnetic-force magnet 42 are not included at each magnetic pole part 33. In this rotor 30, a high-density magnetic flux flows radially outward at the N-magnetic pole part 33N from the pole surface PF (N-pole) radially outward of the fixed magnetic-force magnet 40. A part of the magnetic flux repels mutually with the magnetization magnetic flux applied to the variable magnetic-force magnet 50 during the magnetizing processing. For this reason, the flux density of the magnetization magnetic flux which passes through the variable magnetic-force magnet 50 is reduced. As a result, the variable magnetic-force magnet 50 cannot be magnetized efficiently.

Figure 7:
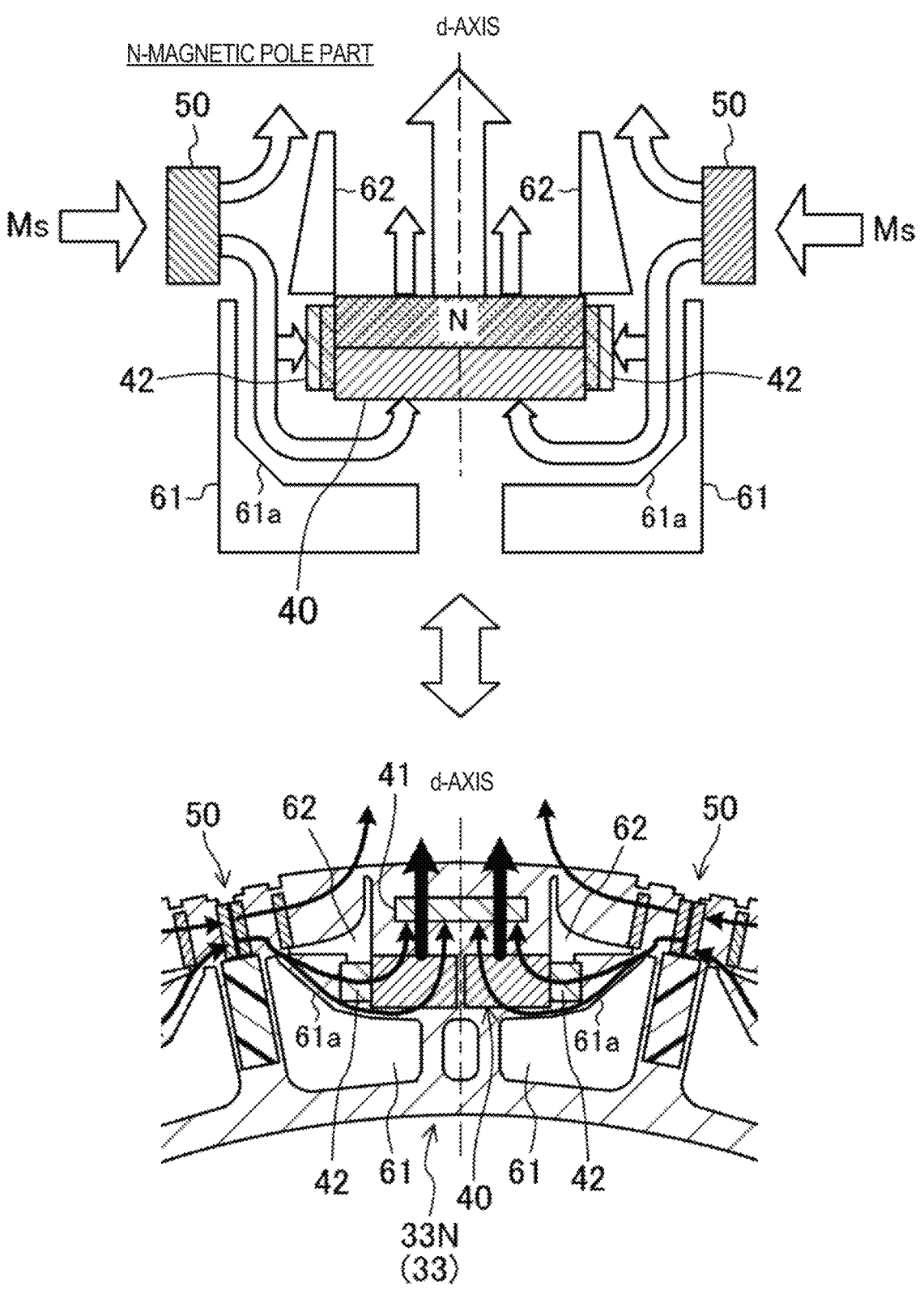
FIG. 7 is a conceptual diagram illustrating a configuration of the N-magnetic pole part of the rotor, and a flow of a magnetic flux during the magnetizing processing, according to the embodiment.

FIG. 7 illustrates a structure of the rotor 30 of this embodiment indicated corresponding to FIG. 6. The magnetic reluctance of air is overwhelmingly high as compared with the magnetic reluctance of the rotor core 32. Therefore, by forming the second cavity part 62, a magnetic flux path in which the high-density magnetic flux which exits from the fixed magnetic-force magnet 40 and the magnetization magnetic flux repel mutually is intercepted in the N-magnetic pole part 33N. Further, the magnetic flux has a characteristic to flow by the shortest route. Therefore, in the N-magnetic pole parts 33N, a flow of the magnetization magnetic flux in the forward direction from the variable magnetic-force magnet 50 toward the fixed magnetic-force magnet 40 is formed by the flux path 39.

The flow of the magnetization magnetic flux in the flux path 39 is guided by the curved surface 61*a* of the first cavity part 61. Further, the magnetization magnetic flux which flows through the flux path 39 in the N-magnetic pole part 33N flows into the fixed magnetic-force magnet 40 from the radially outward pole surface PF (S-pole), and it is drawn into the fixed magnetic-force magnet 40 from the second auxiliary fixed magnetic-force magnet 42 due to the magnetic force of the second auxiliary fixed magnetic-force magnet 42. Therefore, it also flows in from the circumferential end surface of this fixed magnetic-force magnet 40. Thus, the flow of the magnetization magnetic flux between the fixed magnetic-force magnet 40 and the variable magnetic-force magnet 50 is serialized. Therefore, in the magnetizing processing, the magnetization magnetic flux can be collected to the variable magnetic-force magnet 50. As a result, by the magnetizing processing, the variable magnetic-force magnet 50 can be magnetized efficiently until the magnetic force reaches saturation, even under the limited condition.

Figure 8:
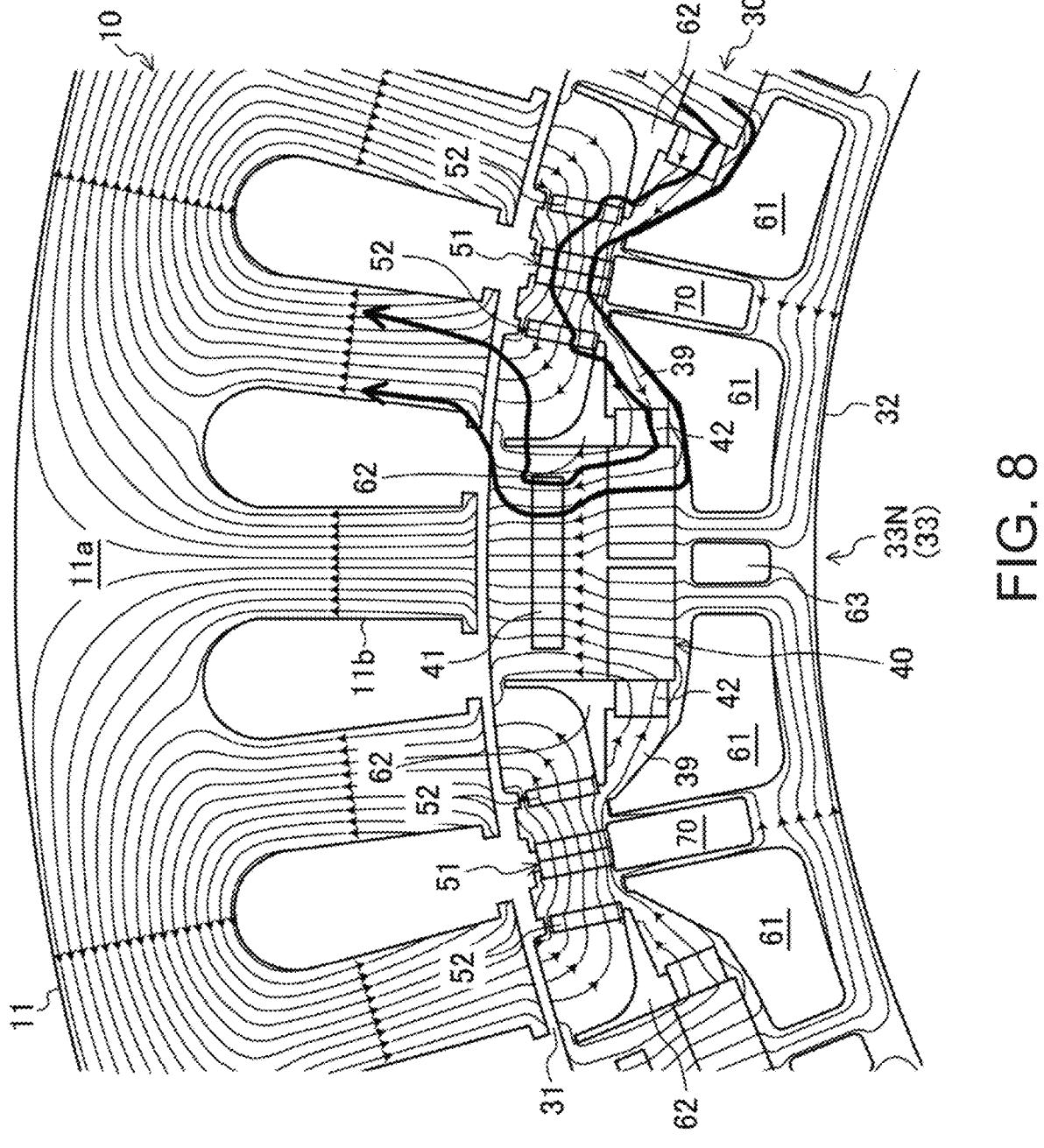
FIG. 8 is a view illustrating magnetic flux lines of the N-magnetic pole part of the rotor according to the embodiment, under the magnetizing processing.
Figure 9:
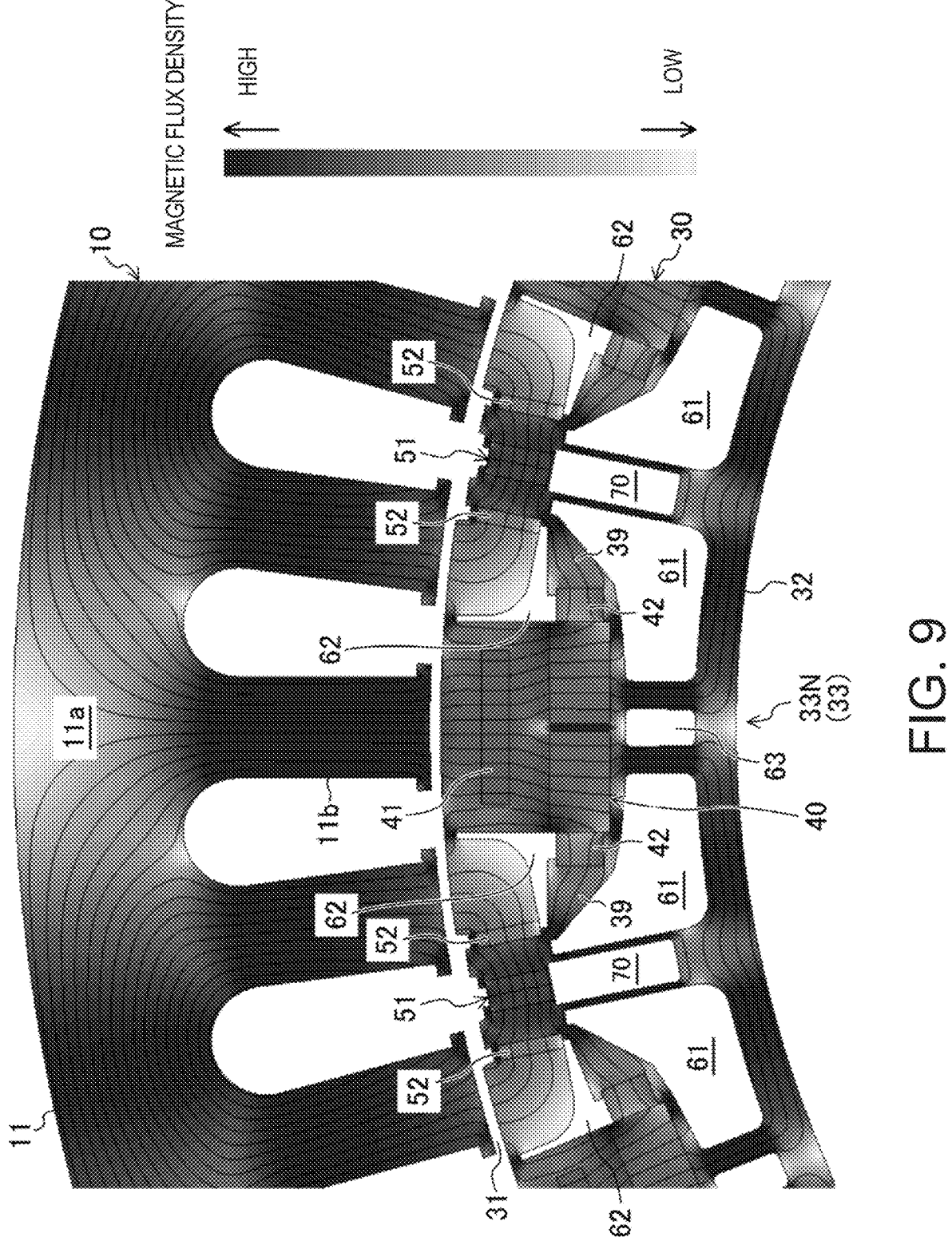
FIG. 9 is a contour diagram of a flux density of the N-magnetic pole part of the rotor according to the embodiment, under the magnetizing processing.

FIG. 8 illustrates magnetic flux lines when applying d-axis current to the coil 12 of the stator 10 by the magnetizing processing. Further, FIG. 9 illustrates a contour diagram of the flux density according to the magnetizing magnetic field during the magnetizing processing. FIGS. 8 and 9 are views based on a result of a simulation using a magnetic field analysis program. As illustrated in FIG. 8, in the drive motor 2M, during the magnetizing processing, a strong magnetizing magnetic field occurs in the coil 12 of the stator 10, and the magnetizing magnetic field acts on the first variable magnetic-force magnet 51 and the second variable magnetic-force magnet 52.

At this time, a part of the magnetization magnetic flux enters into the second closure area 38 of the S-magnetic pole part 33S from the stator 10 side, passes through the second variable magnetic-force magnet 52 of the S-magnetic pole part 33S, the first variable magnetic-force magnet 51, and the second variable magnetic-force magnet 52 of the N-magnetic pole part 33N from the second closure area 38, and exits from the second closure area 38 of the N-magnetic pole part 33N to the stator 10 side. The magnetization magnetic flux which passed through the flux path 39 of the S-magnetic pole part 33S also enters into the first variable magnetic-force magnet 51. A part of the magnetization magnetic flux which exited from the first variable magnetic-force magnet 51 passes through the flux path 39 of the N-magnetic pole part 33N. Further, a part of the magnetization magnetic flux which passed through the second variable magnetic-force magnet 52 penetrates the tip-end part of the circumferential-side extending part 62b, and flows into the flux path 39 of the N-magnetic pole part 33N.

The magnetization magnetic flux which flows through the flux path 39 enters directly into the fixed magnetic-force magnet 40 from the radially inward pole surface PF (S-pole), or enters from the circumferential end surface via the second auxiliary fixed magnetic-force magnet 42. Further, the magnetization magnetic flux which exited from the fixed magnetic-force magnet 40 flows to the stator 10 side through the first closure area 37. A part of the magnetization magnetic flux passing through the first closure area 37 is converged into the first auxiliary fixed magnetic-force magnet 41, and other parts pass through the side of the first auxiliary fixed magnetic-force magnet 41 in the circumferential direction, and exit to the stator 10 side. At this time, a part of the magnetization magnetic flux penetrates the tip-end side of the radial-side extending part 62a, and flows to the stator side.

In such a magnetizing magnetic field, in the N-magnetic pole parts 33N, the high-density magnetic flux which exits from the radially outward pole surface PF (N-pole) of the fixed magnetic-force magnet 40 is limited in the flow in the circumferential direction in the first closure area 37 by the two second cavity parts 62. Thus, a part of the magnetic flux which exits from the fixed magnetic-force magnet 40 and the magnetization magnetic flux which flows through the second closure area 38 repelling each other is suppressed. Further, as described above, the magnetization magnetic flux flows in series between the fixed magnetic-force magnet 40 and the first variable magnetic-force magnet 51 (see arrows in FIG. 8). Therefore, as illustrated in FIG. 9, the magnetization magnetic flux is collected to the first variable magnetic-force magnet 51, and the flux density of the magnetization magnetic flux which passes through the first variable magnetic-force magnet 51 is increased.

Feature of Embodiment

In the rotor 30 of this embodiment, the first cavity part 61 is formed in the rotor core 32 at each magnetic pole part 33. The first cavity part 61 extends between a position radially inward of the fixed magnetic-force magnet 40 and a position radially inward of the first variable magnetic-force magnet 51. According to this, a curved surface 61a which defines radially outward of the first cavity part 61 faces the flux path 39 between the fixed magnetic-force magnet 40 and the first variable magnetic-force magnet 51. In the magnetizing processing, magnetization magnetic flux is guided by such a curved surface 61a of the first cavity part 61. Further, the second auxiliary fixed magnetic-force magnet 42 is disposed on both sides of the fixed magnetic-force magnet 40 in the circumferential direction. Since the magnetizing direction of the second auxiliary fixed magnetic-force magnet 42 is oriented in the circumferential direction, the magnetic flux can be drawn into the fixed magnetic-force magnet 40 by the magnetic force of the second auxiliary fixed magnetic-force magnet 42. Therefore, in the magnetizing processing, the magnetization magnetic flux can flow into the fixed magnetic-force magnet 40 also from the end surfaces in the circumferential direction. By such a combination, the fixed magnetic-force magnet 40 and the first variable magnetic-force magnet 51 can form the magnetically in series relationship. Therefore, in the magnetizing processing, the high-density magnetic flux which exits from the fixed magnetic-force magnet 40 and the magnetization magnetic flux which passes through the first variable magnetic-force magnet 51 repelling each other can be suppressed, and therefore, the magnetization magnetic flux can be collected efficiently to the first variable magnetic-force magnet 51. Therefore, the flux density of the magnetic flux applied to the first variable magnetic-force magnet 51 can be increased by the magnetizing processing.

In the rotor 30 of this embodiment, the second cavity part 62 is formed in the rotor core 32 at each magnetic pole part 33, in addition to the first cavity part 61. The second cavity part 62 is separated radially outward from the first cavity part 61, and extends toward the first variable magnetic-force magnet in the circumferential direction from a position radially outward of the first variable magnetic-force magnet 51 of the fixed magnetic-force magnet 40. The flux path 39 which is comprised of a part of the rotor core 32 is formed between the first cavity part 61 and the second cavity part 62. By this flux path, the magnetically in series relationship between the fixed magnetic-force magnet 40 and the first variable magnetic-force magnet 51 can be established. This is advantageous to a further efficient collection of the magnetic flux to the first variable magnetic-force magnet 51, and an increase in the flux density of magnetic flux applied to the first variable magnetic-force magnet 51 by the magnetizing processing.

In the rotor 30 of this embodiment, each magnetic pole part 33 includes the second variable magnetic-force magnet 52. The second variable magnetic-force magnet 52 is disposed between the part of the second cavity part 62 on the first variable magnetic-force magnet 51 side in the rotor core 32 and the outer circumferential surface 32*a* of the rotor core 32. Further, since the magnetizing direction of the second variable magnetic-force magnet 52 is oriented in the circumferential direction similarly to the first variable magnetic-force magnet 51, the second variable magnetic-force magnet 52 can form the magnetically in series relationship with the fixed magnetic-force magnet 40 and the first variable magnetic-force magnet 51. Therefore, in the magnetizing processing, at least a part of the magnetization magnetic flux passes through the second variable magnetic-force magnet 52 between the fixed magnetic-force magnet 40 and the first variable magnetic-force magnet 51. This collects the magnetization magnetic flux to the first variable magnetic-force magnet 51 further efficiently, which is advantageous to an increase in the flux density applied to the first variable magnetic-force magnet 51 by the magnetizing processing.

As described above, the desirable embodiment is described as illustration of the art of the present disclosure. However, the art of the present disclosure is not limited to the embodiment, but it may also be applied to other embodiments in which any of change, replacement, addition, abbreviation, etc. is suitably made to the embodiment. Further, regarding the embodiment, it should be appreciated by the person skilled in the art that various modifications are possible without departing from the scope of the present disclosure, and such modifications also belong to the scope of the present disclosure.

Although in the embodiment the hybrid vehicle is illustrated, it is not limited to the hybrid vehicle. The automobile to which the art of the present disclosure is applied may be an electric vehicle which does not carry the engine 2E but travels only by the drive motor 2M. Further, the rotary electric machine according to the art of the present disclosure may also be applied to railroad vehicles other than automobiles, and may be used for apparatuses other than for vehicles, such as refrigerators and laundry machines.

INDUSTRIAL APPLICABILITY

As described above, the art of the present disclosure is useful for the rotor, the rotary electric machine, and the vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile (Vehicle)
2M Drive Motor (Rotary Electric Machine)
3D Driving Wheel
10 Stator
30 Rotor
31 Air Gap
32 Rotor Core
32*a* Outer Circumferential Surface of Rotor Core
33 Pole Part
40 Fixed Magnetic-force Magnet
41 First Auxiliary Fixed Magnetic-force Magnet (Auxiliary Fixed Magnetic-force Magnet)
42 Second Auxiliary Fixed Magnetic-force Magnet (Auxiliary Fixed Magnetic-force Magnet)

51 First Variable Magnetic-force Magnet
52 Second Variable Magnetic-force Magnet
61 First Cavity Part
62 Second Cavity Part

What is claimed is:

1. A rotor, comprising:
a rotor core; and
a plurality of magnetic pole parts provided to the rotor core,
wherein the plurality of magnetic pole parts are lined up along an outer circumferential surface of the rotor core,
wherein the rotor is combined with a stator disposed radially outward of the rotor core, and a magnetic force of the plurality of magnetic pole parts is changeable by a given magnetic flux generated by the stator,
wherein each magnetic pole part of the plurality of magnetic pole parts includes:
  a fixed magnetic-force magnet disposed so that a magnetizing direction thereof is oriented in a radial direction of the rotor core;
  first variable magnetic-force magnets disposed at positions radially outward of the fixed magnetic-force magnet on both sides of the fixed magnetic-force magnet in a circumferential direction of the rotor core so that magnetizing directions thereof are oriented in the circumferential direction, a magnetization state of the first variable magnetic-force magnets being changeable by the given magnetic flux;
  a first cavity part formed in the rotor core so as to extend between a position radially inward of the fixed magnetic-force magnet and a position radially inward of a respective first variable magnetic-force magnet; and
  auxiliary fixed magnetic-force magnets disposed on both sides of the fixed magnetic-force magnet in the circumferential direction so that magnetizing directions thereof are oriented in the circumferential direction, wherein a pole surface with the same polarity as a pole surface facing radially outward of the fixed magnetic-force magnet is located on a fixed magnetic-force magnet side of the auxiliary fixed magnetic-force magnets,
wherein a second cavity part is formed in a part of the rotor core that is separated radially outward from the first cavity part, and extends toward the auxiliary fixed magnetic-force magnets from a position radially outward of a first variable magnetic-force magnet side of the fixed magnetic-force magnet, and
wherein a second variable magnetic-force magnet is disposed between a part of the second cavity part in the rotor core on the first variable magnetic-force magnet side and the outer circumferential surface of the rotor core, and the second variable magnetic-force magnet is disposed between the fixed magnetic-force magnet and the respective first variable magnetic-force magnet in the circumferential direction, a magnetization state of the second variable magnetic-force magnet being changeable by the given magnetic flux.

2. A rotary electric machine, comprising:
the rotor of claim 1; and
a stator disposed radially outward of the rotor.

3. A vehicle, comprising:
the rotary electric machine of claim 2; and
driving wheels to which a motive force of the rotary electric machine is transmitted.

4. The rotor of claim 1, wherein the magnetic pole part includes a nonmagnetic material disposed radially inward of the respective first variable magnetic-force magnet, and wherein the first cavity part extends from a position radially inward of the fixed magnetic-force magnet to a position near the nonmagnetic material in the circumferential direction, and extends progressively more radially outward from a fixed magnetic-force magnet side thereof toward a nonmagnetic material side thereof.

5. The rotor of claim 1, wherein a radially outward part of the first cavity part is located immediately radially inward of an area between the respective first variable magnetic-force magnet and the second variable magnetic-force magnet.

6. The rotor of claim 1, wherein the auxiliary fixed magnetic-force magnets are disposed on both sides of the fixed magnetic-force magnet in the circumferential direction in line symmetry with respect to a d-axis so that the magnetizing directions are oriented in the circumferential direction.

7. The rotor of claim 1, wherein the auxiliary fixed magnetic-force magnets are each located adjacent to a respective end part of the fixed magnetic-force magnet in the circumferential direction, and wherein one of pole surfaces of the auxiliary fixed magnetic-force magnets is in contact with the fixed magnetic-force magnet.

8. A rotor, comprising:

a rotor core; and a plurality of magnetic pole parts provided to the rotor core, wherein the plurality of magnetic pole parts are lined up along an outer circumferential surface of the rotor core, wherein the rotor is combined with a stator disposed radially outward of the rotor core, and a magnetic force of the plurality of magnetic pole parts is changeable by a given magnetic flux generated by the stator, wherein each magnetic pole part of the plurality of magnetic pole parts includes:

a fixed magnetic-force magnet disposed so that a magnetizing direction thereof is oriented in a radial direction of the rotor core;

first variable magnetic-force magnets disposed at positions radially outward of the fixed magnetic-force magnet on both sides of the fixed magnetic-force magnet in a circumferential direction of the rotor core so that magnetizing directions thereof are oriented in the circumferential direction, a magnetization state of the first variable magnetic-force magnets being changeable by the given magnetic flux;

a first cavity part formed in the rotor core so as to extend between a position radially inward of the fixed magnetic-force magnet and a position radially inward of a respective first variable magnetic-force magnet; and auxiliary fixed magnetic-force magnets disposed on both sides of the fixed magnetic-force magnet in the circumferential direction so that magnetizing directions thereof are oriented in the circumferential direction, wherein a pole surface with the same polarity as a pole surface facing radially outward of the fixed magnetic-force magnet is located on a fixed magnetic-force magnet side of the auxiliary fixed magnetic-force magnets, wherein a second cavity part is formed in a part of the rotor core that is separated radially outward from the first cavity part, and extends toward the auxiliary fixed magnetic-force magnets from a position radially outward of a first variable magnetic-force magnet side of the fixed magnetic-force magnet, wherein the auxiliary fixed magnetic-force magnets are each located adjacent to a respective end part of the fixed magnetic-force magnet in the circumferential direction, and wherein one of pole surfaces of the auxiliary fixed magnetic-force magnets is in contact with the fixed magnetic-force magnet, wherein the second cavity part is formed in the rotor core so as to extend toward the respective first variable magnetic-force magnet, in the circumferential direction, from a position radially outward of a surface of the fixed magnetic-force magnet on the first variable magnetic-force magnet side, wherein the second cavity part has a radial-side extending part and a circumferential-side extending part, wherein a first auxiliary fixed magnetic-force magnet is disposed between the fixed magnetic-force magnet of the rotor core and the outer circumferential surface of the rotor core so that the magnetizing direction is oriented in the radial direction centering on a d-axis, and wherein the radial-side extending part partitions between the first auxiliary fixed magnetic-force magnet and the respective first variable magnetic-force magnet, the radial-side extending part extending radially outward from a radially outward side of the auxiliary fixed magnetic-force magnet of the auxiliary fixed magnetic-force magnets.

9. A rotor, comprising:

a rotor core; and a plurality of magnetic pole parts provided to the rotor core, wherein the plurality of magnetic pole parts are lined up along an outer circumferential surface of the rotor core, wherein the rotor is combined with a stator disposed radially outward of the rotor core, and a magnetic force of the plurality of magnetic pole parts is changeable by a given magnetic flux generated by the stator, wherein each magnetic pole part of the plurality of magnetic pole parts includes:

a fixed magnetic-force magnet disposed so that a magnetizing direction thereof is oriented in a radial direction of the rotor core;

first variable magnetic-force magnets disposed at positions radially outward of the fixed magnetic-force magnet on both sides of the fixed magnetic-force magnet in a circumferential direction of the rotor core so that magnetizing directions thereof are oriented in the circumferential direction, a magnetization state of the first variable magnetic-force magnets being changeable by the given magnetic flux;

a first cavity part formed in the rotor core so as to extend between a position radially inward of the fixed magnetic-force magnet and a position radially inward of a respective first variable magnetic-force magnet; and auxiliary fixed magnetic-force magnets disposed on both sides of the fixed magnetic-force magnet in the circumferential direction so that magnetizing directions thereof are oriented in the circumferential direction, wherein a pole surface with the same polarity as a pole surface facing radially outward of the fixed magnetic-force magnet is located on a fixed magnetic-force magnet side of the auxiliary fixed magnetic-force magnets, wherein a second cavity part is formed in a part of the rotor core that is separated radially outward from the first cavity part, and extends toward the auxiliary fixed magnetic-force magnets from a position radially outward of a first variable magnetic-force magnet side of the fixed magnetic-force magnet, wherein the auxiliary fixed magnetic-force magnets are each located adjacent to a respective end part of the fixed magnetic-force magnet in the circumferential direction, and wherein one of pole surfaces of the auxiliary fixed magnetic-force magnets is in contact with the fixed magnetic-force magnet, wherein the second cavity part is formed in the rotor core so as to extend toward the respective first variable magnetic-force magnet, in the circumferential direction, from a position radially outward of a surface of the fixed magnetic-force magnet on the first variable magnetic-force magnet side, wherein the second cavity part has a radial-side extending part and a circumferential-side extending part, wherein the radial-side extending part extends radially outward from a radially outward side of the auxiliary fixed magnetic-force magnet of the auxiliary fixed magnetic-force magnets, and wherein a part of an end surface of the fixed magnetic-force magnet radially outward of a part which contacts the auxiliary fixed magnetic-force magnet is exposed to the second cavity part, and part of a radially outward side surface of the auxiliary fixed magnetic-force magnet is exposed to the second cavity part, and a first closure area is formed in a radially outward part of the each magnetic pole part, and the first closure area is defined by two second cavity parts on both sides in the circumferential direction and the pole surface of the fixed magnetic-force magnet as an inward side in the radial direction.

\* \* \* \* \*